US008390897B2

(12) United States Patent  
Carey

(10) Patent No.: US 8,390,897 B2
(45) Date of Patent: Mar. 5, 2013

(54) METHOD AND SYSTEM FOR CONTROLLED PRODUCTION OF SECURITY DOCUMENTS, ESPECIALLY BANKNOTES

(75) Inventor: Martin Carey, Les Cullayes (CH)

(73) Assignee: KBA-Notasys SA, Lausanne (CH)

( * ) Notice: Subject to any disclaimer, the term of this patent is extended or adjusted under 35 U.S.C. 154(b) by 468 days.

(21) Appl. No.: 12/679,788

(22) PCT Filed: Oct. 1, 2008

(86) PCT No.: PCT/IB2008/053996
§ 371 (c)(1),
(2), (4) Date: Mar. 24, 2010

(87) PCT Pub. No.: WO2009/044352
PCT Pub. Date: Apr. 9, 2009

(65) Prior Publication Data
US 2010/0202024 A1    Aug. 12, 2010

(30) Foreign Application Priority Data
Oct. 2, 2007  (EP) .................................. 07117734

(51) Int. Cl.
G06K 15/00  (2006.01)
H04N 1/40  (2006.01)
G06F 15/00  (2006.01)
G06F 3/12  (2006.01)
G06K 1/00  (2006.01)
(52) U.S. Cl. ..................................... 358/3.28; 358/1.15
(58) Field of Classification Search .......... None
See application file for complete search history.

(56) References Cited

U.S. PATENT DOCUMENTS

| | | | |
|---|---|---|---|
| 3,939,621 A | 2/1976 | Giori |
| 4,045,944 A | 9/1977 | Giori |
| 4,453,707 A | 6/1984 | Kuhfuss |
| 4,516,496 A | 5/1985 | Giori |
| 4,558,557 A | 12/1985 | Kuehfuss |
| 4,633,395 A | 12/1986 | Kuehfuss |
| 5,062,359 A | 11/1991 | Giori |
| 5,432,702 A | 7/1995 | Barnett |
| 5,626,005 A | 5/1997 | Klingelhoefer |
| 5,671,671 A | 9/1997 | Wyssmann et al. |
| 5,899,145 A | 5/1999 | Schaede |

(Continued)

FOREIGN PATENT DOCUMENTS

| | | |
|---|---|---|
| CH | 502 897 | 3/1971 |
| EP | 0 061 795 A1 | 10/1982 |

(Continued)

*Primary Examiner* — Douglas Tran
(74) *Attorney, Agent, or Firm* — Seager, Tufte & Wickhem LLC

(57) ABSTRACT

A method and system for controlled production of security documents, especially banknotes, wherein the security documents are subjected to a plurality of successive printing and processing operations on a plurality of processing stations. At least one production order is defined that may be subdivided into a plurality of production loads each being assigned a machine-readable load identifier. Selected processing stations are assigned to process the production order according to the production workflow. Each production load is selectively processed through the processing stations depending on the determined production workflow of the corresponding production order defined for each production load, whereby each production load is first subjected to a load acceptance procedure based on its machine-readable load identifier before being authorized to be processed on a selected processing station among the available processing stations.

19 Claims, 20 Drawing Sheets

U.S. PATENT DOCUMENTS

| | | |
|---|---|---|
| 5,960,716 A | 10/1999 | Schaede |
| 6,062,134 A | 5/2000 | Eitel et al. |
| 6,101,939 A | 8/2000 | Giori et al. |
| 6,109,172 A | 8/2000 | Wyssmann |
| 6,112,651 A | 9/2000 | Eitel et al. |
| 6,142,069 A | 11/2000 | Eitel et al. |
| 6,182,959 B1 | 2/2001 | Eitel et al. |
| 6,263,790 B1 | 7/2001 | Wyssmann et al. |
| 6,522,939 B1 | 2/2003 | Strauch et al. |
| 6,968,783 B2 | 11/2005 | Hug et al. |
| 7,011,020 B2 | 3/2006 | Dunninger et al. |
| 7,216,583 B2 | 5/2007 | Schaede |
| 7,434,727 B2 | 10/2008 | Bolognini |
| 7,464,642 B2 | 12/2008 | Schaede |
| 2004/0112235 A1 | 6/2004 | Hug et al. |
| 2004/0193465 A1 | 9/2004 | Sangroniz et al. |
| 2004/0237816 A1 | 12/2004 | Dunninger et al. |
| 2005/0154677 A1 | 7/2005 | Giori |
| 2006/0144265 A1 | 7/2006 | Dunninger et al. |
| 2006/0162585 A1 | 7/2006 | Schaede |
| 2006/0162591 A1 | 7/2006 | Schaede |
| 2006/0208412 A1 | 9/2006 | Reinhard et al. |
| 2006/0213384 A1 | 9/2006 | Reinhard et al. |
| 2006/0219107 A1 | 10/2006 | Gygi |
| 2006/0243146 A1 | 11/2006 | Schaede |
| 2007/0012770 A1 | 1/2007 | Bolognini |
| 2007/0041034 A1 | 2/2007 | Gombert |
| 2007/0113164 A1 | 5/2007 | Hansen et al. |
| 2007/0181016 A1 | 8/2007 | Schaede |
| 2007/0204755 A1 | 9/2007 | Moreau |
| 2007/0222206 A1 | 9/2007 | Schaede et al. |
| 2008/0022351 A1* | 1/2008 | Nohr et al. ............... 725/142 |
| 2008/0235070 A1* | 9/2008 | Seliger ............... 705/8 |
| 2008/0271620 A1 | 11/2008 | Hoier et al. |
| 2008/0271854 A1 | 11/2008 | Eitel et al. |
| 2008/0295724 A1 | 12/2008 | Lohweg et al. |
| 2009/0003656 A1 | 1/2009 | Reinhard et al. |
| 2009/0007807 A1 | 1/2009 | Schaede et al. |
| 2009/0025594 A1 | 1/2009 | Schaede et al. |
| 2009/0095178 A1 | 4/2009 | Schwitzky et al. |
| 2009/0101030 A1 | 4/2009 | Stohr et al. |
| 2009/0243181 A1 | 10/2009 | Sauer |

FOREIGN PATENT DOCUMENTS

| | | |
|---|---|---|
| EP | 0 091 709 | 10/1983 |
| EP | 0 061 795 B1 | 1/1985 |
| EP | 0 406 157 | 1/1991 |
| EP | 0 656 309 | 6/1995 |
| EP | 0 723 864 | 7/1996 |
| EP | 0 873 866 | 10/1998 |
| EP | 0 949 069 | 10/1999 |
| EP | 0 965 446 | 12/1999 |
| EP | 1 602 483 | 12/2005 |
| EP | 1 607 355 | 12/2005 |
| EP | 1 878 679 | 1/2008 |
| WO | 97/29912 | 8/1997 |
| WO | 97/34767 | 9/1997 |
| WO | 97/35721 | 10/1997 |
| WO | 97/35794 | 10/1997 |
| WO | 97/35795 | 10/1997 |
| WO | 97/36756 | 10/1997 |
| WO | 02/083423 | 10/2002 |
| WO | 03/047862 | 6/2003 |
| WO | 03/099579 | 12/2003 |
| WO | 2004/016433 | 2/2004 |
| WO | 2004/069538 | 8/2004 |
| WO | 2004/069539 | 8/2004 |
| WO | 2004/096545 | 11/2004 |
| WO | 2004/101282 | 11/2004 |
| WO | 2005-000585 | 1/2005 |
| WO | 2005/008605 | 1/2005 |
| WO | 2005/008606 | 1/2005 |
| WO | 2005/077656 | 8/2005 |
| WO | 2005/090088 | 9/2005 |
| WO | 2005/102728 | 11/2005 |
| WO | 2005/102733 | 11/2005 |
| WO | 2005/118294 | 12/2005 |
| WO | 2005/123415 | 12/2005 |
| WO | 2006/129245 | 12/2006 |
| WO | 2007/042919 | 4/2007 |
| WO | 2007/060615 | 5/2007 |
| WO | 2007/060624 | 5/2007 |
| WO | 2007/105059 | 9/2007 |
| WO | 2007/105061 | 9/2007 |

* cited by examiner

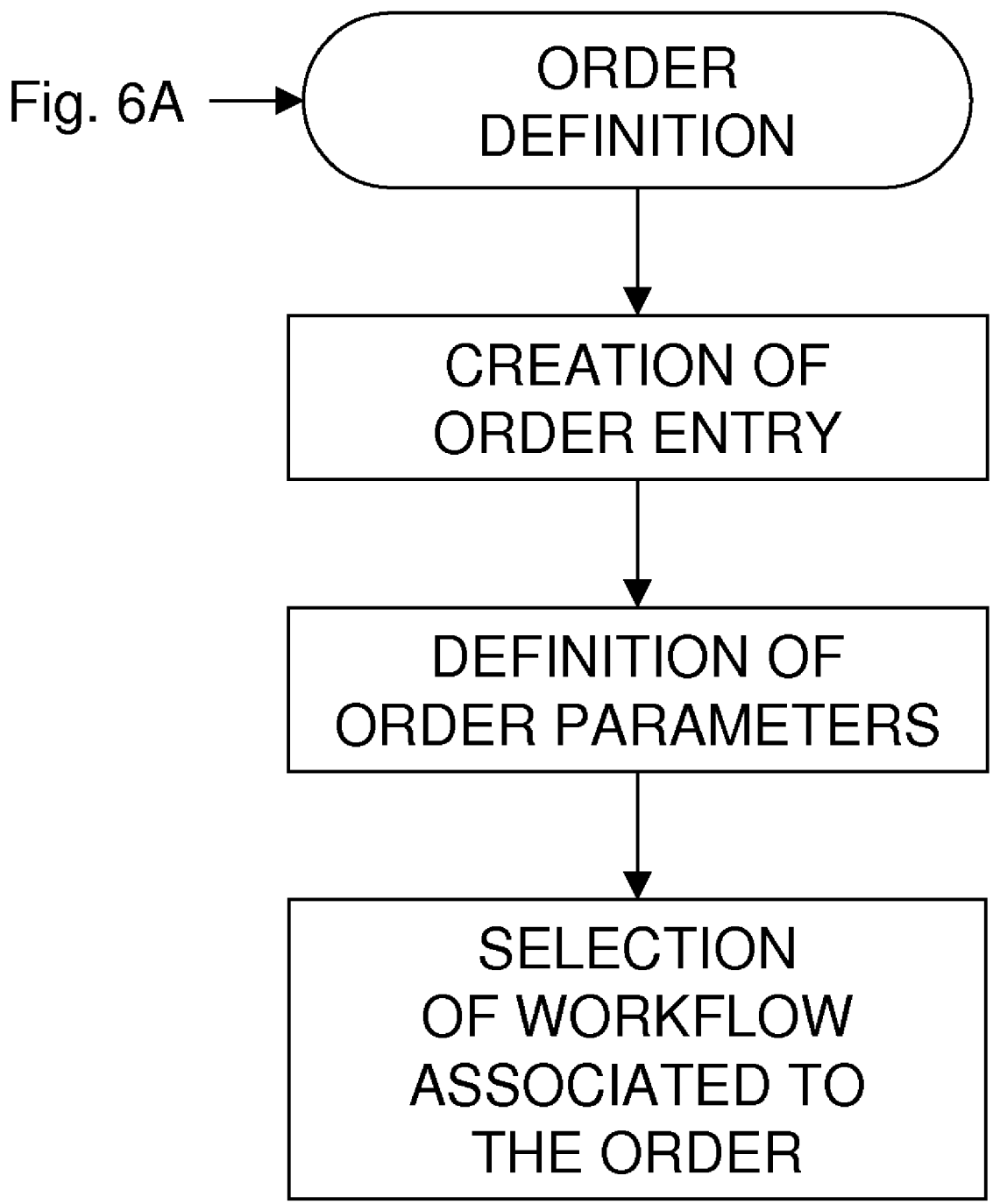

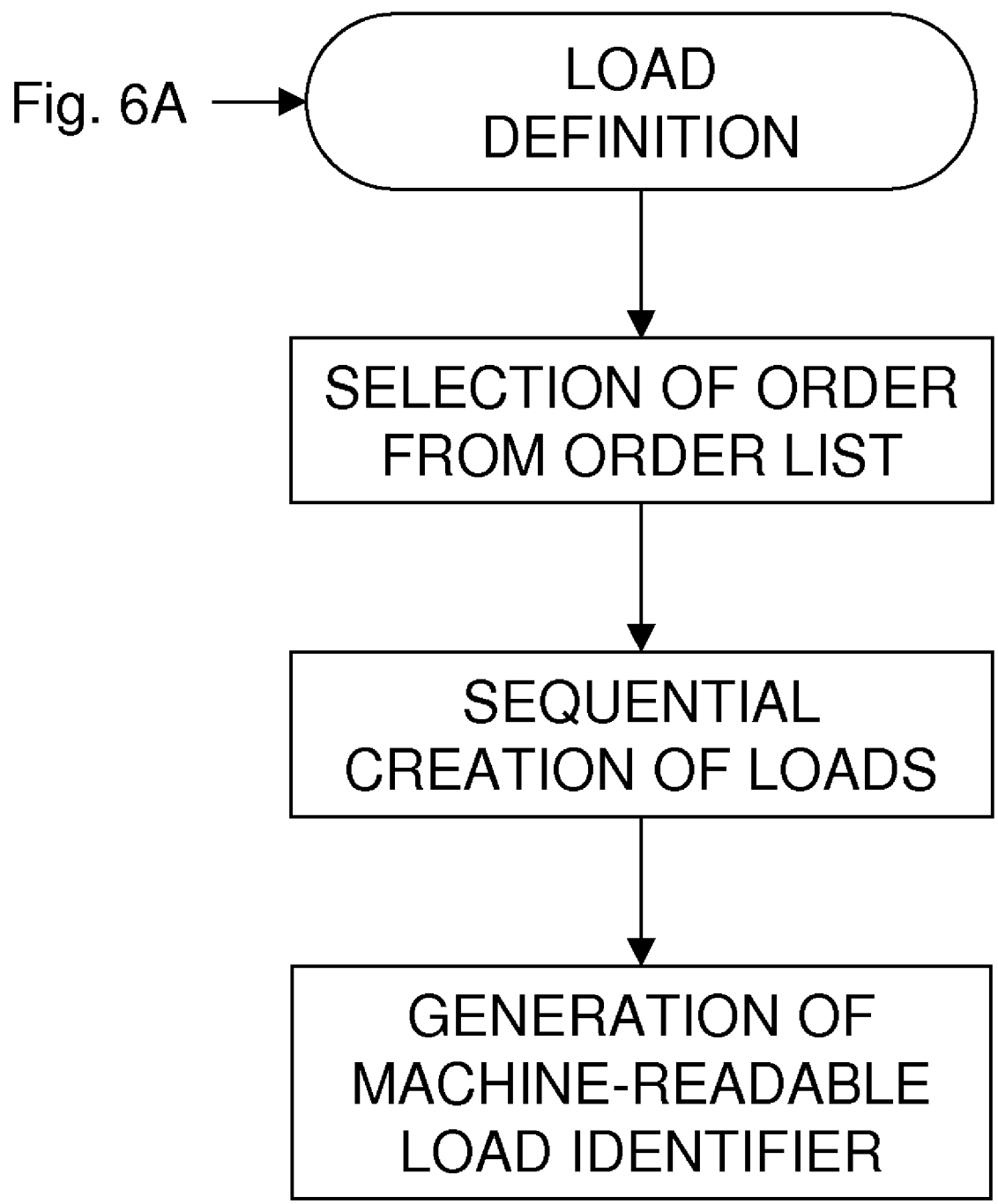

METHOD AND SYSTEM FOR CONTROLLED PRODUCTION OF SECURITY DOCUMENTS, ESPECIALLY BANKNOTES

TECHNICAL FIELD

The present invention generally relates to a method for controlled production of security documents, especially banknotes, wherein the security documents are subjected to a plurality of successive printing and processing operations on a plurality of processing stations. The present invention also relates to a system for carrying out this method.

BACKGROUND OF THE INVENTION

Methods for controlled production of security documents are already known in the art. U.S. Pat. No. 4,633,395 for instance discloses such a method wherein sheets of security documents are tracked throughout the production process. Before travelling through a first processing station, each sheet is provided with a unique sheet identification code on an edge thereof, which sheet identification code is stored in a computer. Before and after each operation in the successive processing stations, the sheet identification codes are read by automatic reading units. In this way, each individual sheet can be followed during its various operations and the possible loss of a sheet can be identified immediately. International application WO 02/083423 A1 discloses a similar solution wherein sheets can be tracked individually throughout the whole production process. According to this other solution, the sheet identification codes of a plurality of sheets are transferred to a central database over a data network in a single data packet.

While the above solutions are efficient in tracking individual sheets throughout the whole production process, such solutions are however insufficient when dealing with situations where complex production tasks have to be undertaken, especially when a plurality of distinct production jobs have to be executed in a same printing plant. The tracking of individual sheets is furthermore rather cumbersome to manage in practice as the amount of data to process is considerable.

US patent application No. U.S. 2004/0193465 A1 discloses an automated workflow assignment method designed to enable the submission over the internet (or like computer networks) of print jobs to commercial print shops for printing.

US patent application No. U.S. 2007/0041034 A1 discloses a wireless workflow system for a commercial print shop which is designed to facilitate the work of operators and managers in large-scale commercial print shops.

US patent application No. U.S. 2007/0113164 A1 discloses a system and method for managing the production printing workflow in commercial print shops.

While the solutions disclosed in the above U.S. patent applications might be suitable to deal with jobs and workflows in commercial printing environments, such solution are however not suited for dealing with the production of security documents as such production involves highly specific printing and processing steps performed on printing and processing equipment that is not available to commercial printers.

Nowadays, the production of security documents, especially of banknotes, has become a complex task and involves more processes, machinery and decision-making than ever before. Such complexity and diversity make it even more difficult to manage the production of security documents in an efficient way.

The production of banknotes in particular involves several successive printing and processing operations including:

offset printing for typically printing the colour backgrounds of the banknotes;

silk-screen printing for printing iridescent and/or optically-variable ink patterns;

foil stamping for applying optically-variable devices (OVD's) such as metallic patches, holograms or the like;

intaglio printing for printing one or both sides of the banknotes with complex patterns exhibiting a characteristic tactility and appearance (e.g. portraits or other pictorial representations, latent images, guilloche patterns, alphanumerical information, etc.);

letterpress printing for printing variable information such as signatures, dates and serial numbers (which serial numbers are unique to each individual banknote);

the application of protective coatings, in particular by varnishing, to increase the durability and life cycle of the banknotes;

finishing, which finishing typically involves the processing and cutting of the printed sheets or web into individual banknotes and packing of the individual banknotes into banknote bundles and packs of banknote bundles;

quality control to ensure that the banknotes being produced meet the desired quality requirements.

Additional operations that can be carried out on the banknotes during their production may further include the provision of markings by ink-jet printing, laser marking, microperforation, etc.

Considering the high diversity of processes and machinery involved in the production of banknotes, or like security documents, there is a considerable risk that human errors occur during the production and that whole production batches are wrongly processed or even damaged, which in turn affects the production efficiency and costs.

Furthermore, as production schedules become tighter and efforts are made to reduce work-in-progress, production managers are faced with the challenge of planning and managing the production process at higher levels of efficiency, ensuring that deadlines and budgets are respected.

Moreover, there is an increasing trend for the research and development of high security features to fight counterfeiting, which security feature combine and necessitate different printing and processing steps in order to be produced. Such high security features imperatively require a very tight control of the production of the security documents.

There is therefore a need for a method and system enabling machine operators, supervisors and managers working in the printing plant to take critical informed decisions based on precise and up-to-date data, locally or centrally.

SUMMARY OF THE INVENTION

A general aim of the invention is therefore to provide an improved method and system for the controlled production of security documents, especially of banknotes.

A further aim of the invention is to provide such a method and system that is capable of ensuring that security documents are produced in the right sequence through the correct machines and stations, and thereby prevent human errors from occurring.

Another aim of the invention is to provide such a method and system that can provide information about the production process to the people that need it, when they need it, without costly manual data collecting and collation.

Still another aim of the invention is to provide such a method and system that is as flexible as possible and can cope with a vast variety of situations and ways security documents can be produced.

Yet another aim of the present invention is to provide such a method and system that enable a reliable and robust production of security documents, especially such security documents, especially banknotes, which include security features that combine several distinct printing and/or processing steps that need to be carried out precisely, in the right sequence and with the correct materials.

These aims are achieved thanks to the solution defined in the claims.

There is accordingly provided a method for controlled production of security documents, especially banknotes, wherein the security documents are subjected to a plurality of successive printing and processing operations on a plurality of processing stations, the method comprising:

providing a computer network comprising a central server station coupled via a data network to a plurality of local computer stations, one local computer station being operatively coupled to each processing station, defining at least one production order, which production order involves the production of a desired volume of security documents according to a defined production workflow, the production order being subdivided into a plurality of production loads each being assigned a machine-readable load identifier;

assigning selected processing stations among available processing stations to carry out processing of the production order according to the production workflow; and selectively processing each production load through the processing stations depending on the determined production workflow of the corresponding production order defined for each production load, whereby each production load is first subjected to a load acceptance procedure based on its machine-readable load identifier before being authorized to be processed on a selected processing station among the available processing stations.

Thanks to this solution, a substantially risk-free and cost-efficient production of security documents is ensured, the security documents being produced in clearly identified batches that are only allowed to be processed in a determined way according to the associated production order and production workflow defined for that load. In this way, it is in particular ensured that a given production load cannot be wasted as a consequence of it being processed on the wrong equipment or at the wrong time.

Such a processing including the load acceptance procedure based on machine-readable load identifiers is not disclosed nor suggested in U.S. Pat. No. 4,633,395, International application No. WO 02/083423 A1 or U.S. patent applications Nos. U.S. 2004/0193465 A1, U.S. 2007/0041034 A1, U.S. 2007/0113164 A1 listed hereabove.

Thanks to the solution according to the invention, appropriate tools are furthermore made available to key personnel of a printing plant to ensure that they can meet their respective targets.

Another advantage of this solution resides in the fact that there is now provided an efficient architecture for dealing with the production of distinct production orders within a same printing plant.

Advantageous embodiments of the invention form the subject-matter of the dependent claims and are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which:

FIG. 6B is a flow chart illustrating an order definition process whereby a production order is created;

FIG. 6D is a flow chart illustrating a load definition process whereby production loads are created for a selected order;

DETAILED DESCRIPTION OF EMBODIMENTS OF THE INVENTION

The invention will be described hereinafter in the context of the production of banknotes using sheet-fed printing and processing machinery. It shall however be appreciated that the invention is equally applicable to the production of other types of security documents using similar equipment, such as the production of checks, duty stamps, passports and like travel or identity documents, etc. In addition, the present invention applies equally to the production of such security documents on web-fed machinery. In such a case, rather than being produced on distinct successive sheets, the security documents are produced on successive portions of a continuous web, which web is ultimately processed into individual documents. A combination of web-fed and sheet-fed machinery may also be envisaged.

Figure 1:
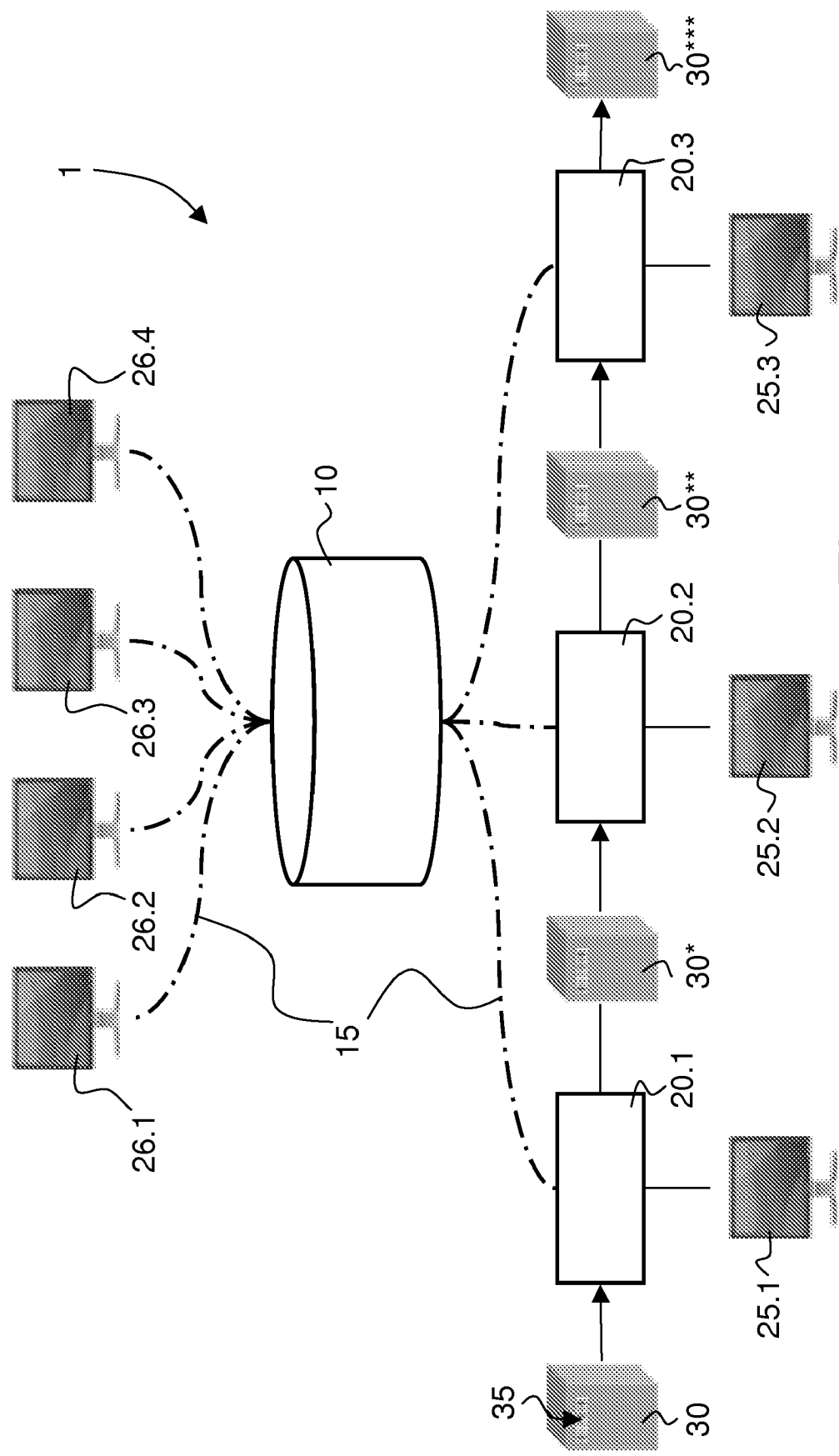
FIG. 1 is a schematic illustration of the general architecture of an embodiment of a system for carrying out the invention.

FIG. 1 schematically illustrates the general architecture of a system to carry out the present invention, which system is designated globally by reference numeral 1. This system is based on a factory-wide information web that extracts information generated by and present on the various processing stations of a printing plant. The system of the present invention harvests this information and centralizes this information for it to be ready to be exploited anywhere where it is needed. This system is not only designed to gather information and provide such information where it is required, but is more importantly designed in such a way as to ensure an efficient and controlled production of security documents as this will be explained hereinafter.

More precisely, the system of the present invention includes a central server station 10 connected via a data network 15 to a plurality of local computer stations (or information consoles), such as stations designated by reference numerals 25.1 to 25.3 and 26.1 to 26.4 in FIG. 1. Local computer stations 25.1 to 25.3 are each operatively coupled to a corresponding processing station 20.1 to 20.3 where the security documents are processed. Such computer stations 25.1 to 25.3 can be an integral part of the computer interface equipment usually present in most modern machinery to control and adjust operation thereof or can be purpose-built computer stations that are specifically designed to enable communication with the printing or processing machinery and interconnection with the network 15. FIG. 1 only shows three processing stations 20.1 to 20.3 and associated local computer stations 25.1 to 25.3. It will of course be understood that such number is purely illustrative and shall not be regarded as limiting the scope of the invention. Additional local computer stations might be provided, such as stations 26.1 to 26.4, which additional stations are not necessarily coupled to any particular processing stations. Such additional stations 26.1 to 26.4 are for instance made available to give access to the system 1 to key managing personnel of the printing plant, including in particular the production manager, the quality manager, the security manager, etc.

User-dependent rights are preferably implemented in order to give selective access to the functionalities of the system to the personnel that need it. For instance, an operator working at a processing station will only be entitled to access functionalities of the system that are specifically directed to load processing operations on that particular processing station (such as the carrying out of the load acceptance procedure described hereinafter). On the other hand, higher ranked personnel, such as the production manager, will be given access to extended functionalities of the system (such as the definition of orders, loads and workflows as explained below). In addition, the above-described system may conveniently implement web-browsing technology to provide access to the functionalities of the system at each local computer station.

As this will be understood from the following description, an important element of the production methodology of the present invention resides in the fact that the banknotes (or like security documents) are produced and processed through the various processing stations in batches, hereinafter referred to as "production loads" or simply "loads". Such loads are schematically illustrated in FIG. 1 and designated by reference numerals 30, 30*, 30, 30*. Each production load is processed according to a corresponding production sequence, or "workflow", which basically depends on the actual features to be printed or otherwise applied on the banknotes. Each time a production load is processed through a corresponding one of the processing stations, its status in the system is updated. Within the scope of the present invention, it shall be understood that a "load" designates a batch containing multiple sheets (in case of sheet printing) or successive portions of a web (in case of web printing). The term "load" is not therefore to be construed as referring to an individual sheet or an individual portion of web.

Each load can be identified and tracked throughout the production process thanks to a corresponding machine-readable load identifier (designated by reference numeral 35 in FIG. 1), which identifier is assigned to the load at the time of its creation and is unique to each load. Such machine-readable load identifier can conveniently be a barcode tag or an RFID (radio-frequency identification) tag. As this will be understood from the following description, the machine-readable load identifiers 35 are especially used to carry out a load acceptance procedure in order to verify if the load is authorized to be processed on any selected processing station. Such load acceptance procedure is in particular intended to guarantee a correct processing sequence of each load and that each load is processed on adequately set up processing equipment. It shall already be appreciated in that respect that any similar load acceptance procedure is not taught in U.S. Pat. No. 4,633,395 and WO 02/083423 A1 which merely provide for the reading at each processing station of individual sheet identifiers provided on each sheet. The provision of a machine-readable load identifier onto each load, rather than onto each individual sheet as taught in U.S. Pat. No. 4,633,395 and WO 02/083423 A1, furthermore achieves a substantial reduction in the quantity of data to be stored and processed by the system, which is also advantageous as this requires a far lower amount of data and generates less traffic of data on the computer network as compared for instance to WO 02/083423 A1. The same is true regarding the solutions discussed in U.S. patent applications Nos. U.S. 2004/0193465 A1, U.S. 2007/0041034 A1, U.S. 2007/0113164 A1 which do not provide for any load acceptance procedure whatsoever.

It will be appreciated that, thanks to the above system architecture, data and information may be captured, viewed and analysed locally at each machine location or remotely via the network. In particular, the system can provide information about the status of each load and its progression for visualization by any authorized user, as well as informative reports, such as reports about production yield or quality, forecasts, cost evaluation, identification of problem areas, etc.

Figure 2:
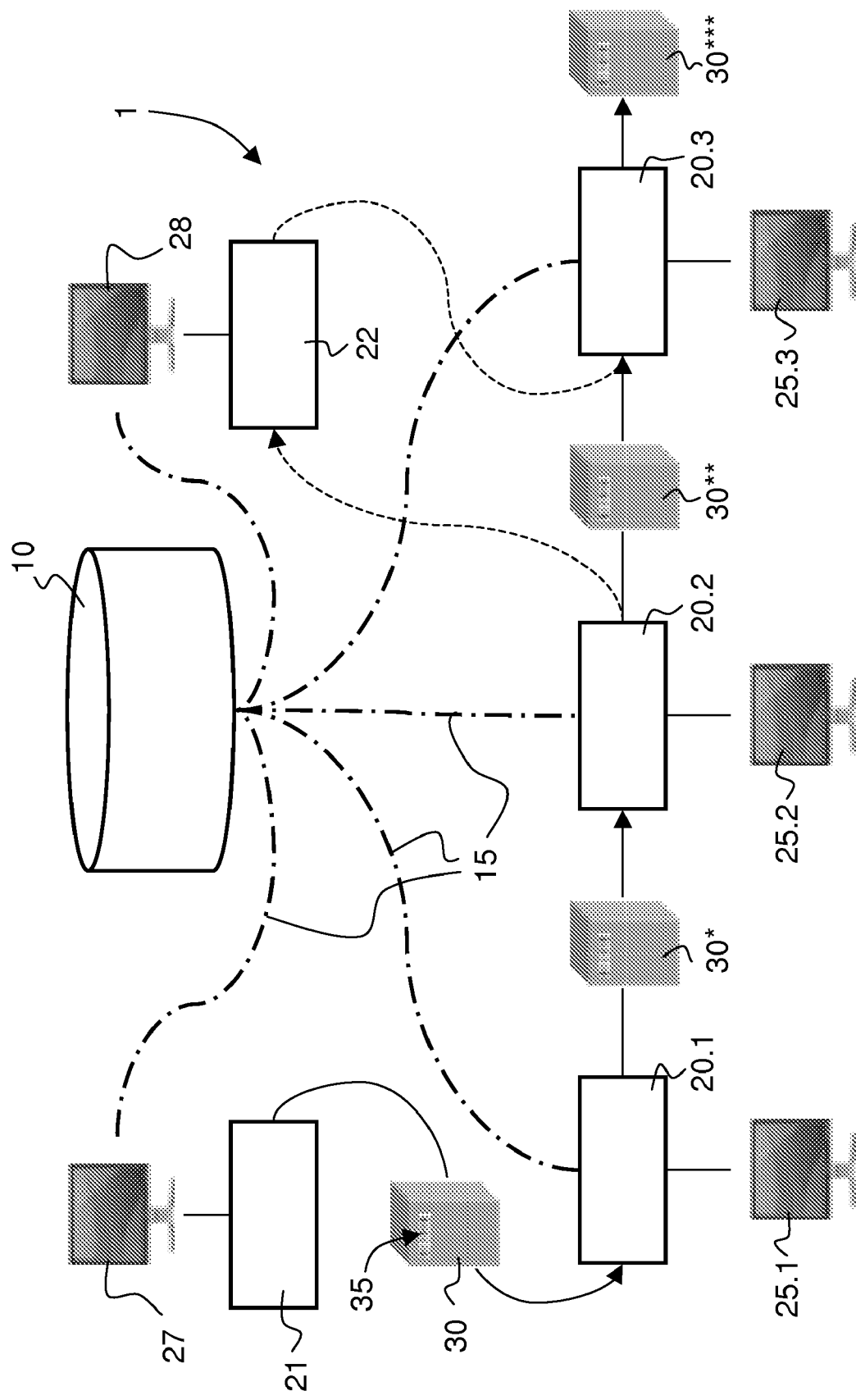
FIG. 2 is a schematic illustration of a variant of the general architecture shown in FIG. 1.

FIG. 2 illustrates a slight variation of the system architecture discussed in reference to FIG. 1. Reference numerals 10, 15, 20.1 to 20.3, 25.1 to 25.3, 30, 30*, 30, 30* and 35 designate the same constituent parts as in FIG. 1 and will thus not be described again. Local computer stations 26.1 to 26.4 have been omitted in FIG. 2 but could of course be provided. FIG. 2 schematically shows two additional stations 21, 22 and associated local computer stations 27, 28 respectively, which local computer stations 27, 28 are also connected to the data network 15. Such additional stations 21, 22 are meant to designate two storage vaults for at least temporarily storing production loads. More precisely, storage vault 21 is a white-paper storage vault for storing yet unprocessed production loads consisting of unprinted paper, while storage vault 22 designates an additional storage vault for storing partly processed production loads. For instance, storage vault 21 may contain yet unprocessed loads 30 from which the loads are taken away before being processed in the first processing station (here considered to be station 20.1). Similarly, storage vault 22 may contain partly processed loads coming out of any processing stations. In the illustration of FIG. 2, dashed lines connecting stations 20.2, 20.3 and storage vault 22 schematically illustrate that loads 30** coming out of station 20.2 can be stored temporarily in storage vault 22 before being fed to subsequent station 20.3.

Storage vaults are usual facilities in most banknote printing plants and are designed to ensure the secure storage of production batches at various production stages. Such storage is not only necessary for obvious security reasons, but may also be required to ensure appropriate drying or curing times between successive printing or processing operations (such as between two successive intaglio printing operations for instance). Within the scope of the present invention, such storage vaults may be made an integral part of the production system by adequately interfacing each such vault with the network 15. In that respect, the coupling of each vault to a corresponding local computer station (such as stations 27, 28 in FIG. 2) ensures that the central server 10 can be provided with the necessary updating data regarding the storage of loads in the vaults 21, 22. Storage vaults 21, 22 could also be considered as "processing stations" where loads are "processed" (i.e. stored). Accordingly, the temporary storage of loads in a vault can be defined if required as a specific step in the production workflow.

In the example of FIG. 2, two separate storage vaults are provided. It will however be appreciated that a single storage vault could be provided or more than two storage vaults, depending on the production requirements, organisation and/or planning.

In the above-discussed examples, one may further provide for an interconnection of the central server station 10 with any other additional system that may be required to carry out production-related operations, such as maintenance operations, personnel planning, etc. Such additional system may in particular include an enterprise resource planning (ERP) system.

Figure 3:
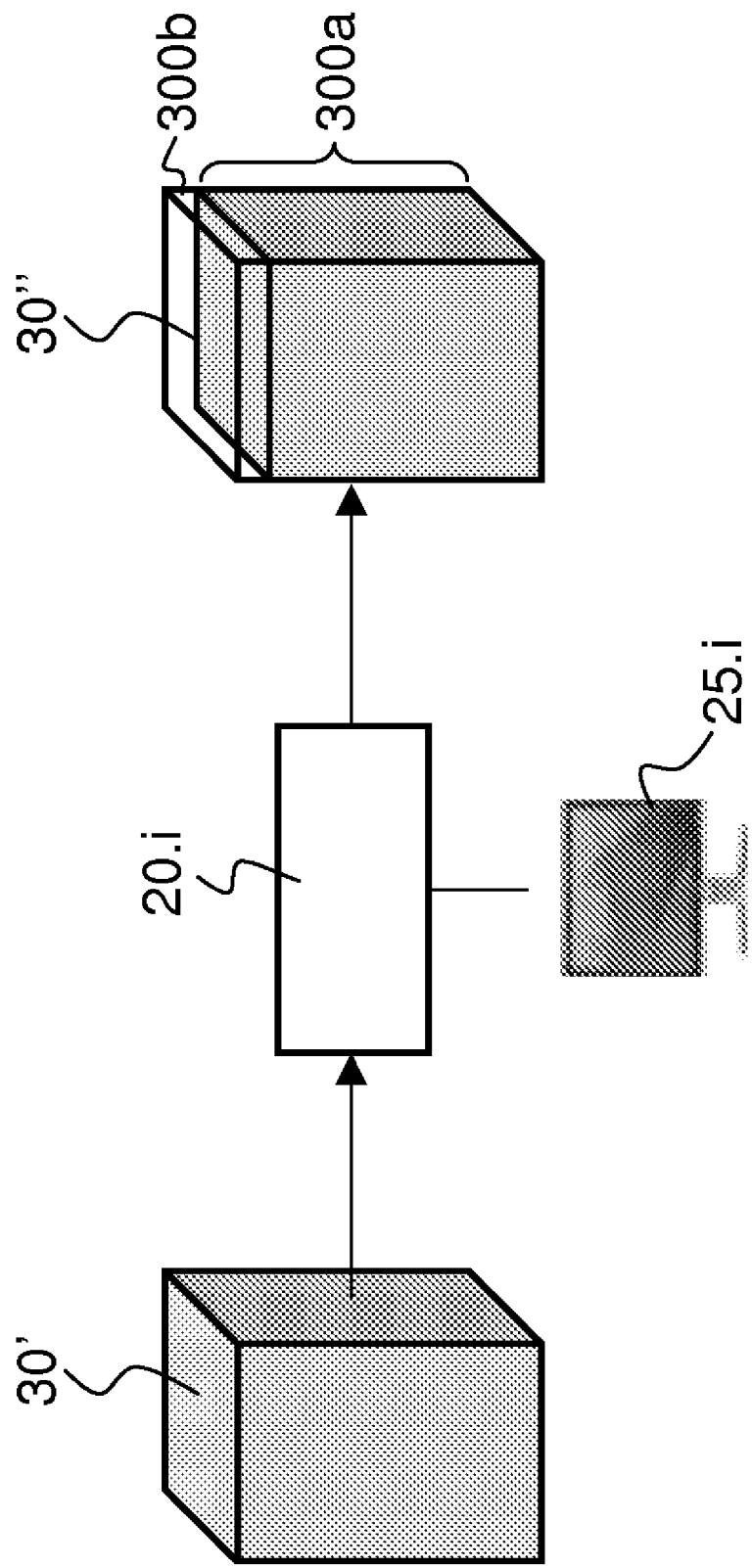
FIG. 3 is a schematic diagram of the processing of a given production load onto a selected processing station, which diagram also illustrates the subdivision of the processed production load into good sheets and waste sheets.

FIG. 3 is a schematic illustration of the processing of a given production load 30' into a processed load 30" through a selected processing station 20.i coupled to its associated local computer station 25.i. In a preferred embodiment of the invention, the security documents (e.g. banknotes) are printed onto sheets, each sheet holding a plurality of security documents, each production load encompassing a plurality of such sheets. For the sake of practicality, a load size is selected such that each load can be easily moved around and identified. An adequate load size is therefore preferably defined, at the start of the production process, as being a size of 7,500 to 10,000 sheets, which sheets can conveniently be stacked onto one palette or stacking board. For the sake of illustration, a load size of 7,500 to 10,000 sheets stacked one upon the other represents a stack having a height of the order of 1.5 to 1.8 meters, which stack can be handled by an operator using a forklift. Such load size is furthermore a typical size for processing onto most banknote printing presses. There is however no restriction on load size within the scope of the present invention.

As a result of each production step (one such step being schematically illustrated in FIG. 3), a given production load 30' is processed into a load 30" that is subdivided into good sheets 300a and waste sheets 300b, it being understood that actions are taken to reduce as much as possible the amount of waste sheets 300b. Such waste sheets 300b are taken out of the normal production process, only the good sheets 300a being further processed as a load during a subsequent production step. In some instances, waste sheets 300b could be further processed if appropriate. Such could for instance be the case at the end of the production process where most printing and processing operations have been carried out and where it is possible to process a waste sheet into bad notes and good notes. The number of waste sheets 300b may of course be null.

In the preferred embodiment, once a load has been processed into good sheets 300a and waste sheets 300b, the number of good sheets 300a and waste sheets 300b is transmitted to the central server station for reporting and monitoring purposes. Additional information may further include the load processing time (i.e. the time required for the load to be processed on the processing station) and any other information useful for reporting and monitoring purposes.

Preferably, each load is handled according to a handoff responsibility rule whereby responsibility associated to the load is transmitted together with the load. This means in particular, that an operator working on a processing station will become responsible for a given load once the operator has received the load to be subjected to the load acceptance procedure. In such a scenario, the operator's responsibility ends when the load is handed over to the next station in the production sequence. According to a variant of this scenario, load responsibility may be handed off in a similar way to an operator in charge of the transport of the load from one station to the next.

The application of a handoff responsibility scenario ensures that the load status may be clearly determined by the system. Two variants of this scenario may be envisaged. According to the first variant, the load is defined as having two possible statuses, namely (a) the load has yet to be transferred to a processing station and responsibility thereof has accordingly not been handed off to any operator of a processing station or (b) the load is awaiting processing (or is in the process of being processed) on a processing station and load responsibility has been handed off to the operator of the processing station. According to this first variant, the whole printing plant may be considered as a "safe" and the load is either considered to be located in the "safe" (i.e. in the printing plant) or at a processing station.

According to the second variant, the load is defined as having an additional status designating that the load is in transit between a processing station and a safe. According to this other variant, the whole printing plant is not anymore considered as a "safe". Rather, at least one safe (or vault) is specifically provided in the printing plant (as schematically illustrated by the vaults in FIG. 2) from which and to which loads are transferred. In such case, load responsibility is handed off to the operator transporting the load when the load is taken out of a safe or taken away from a processing station where the load has just been processed.

Figure 4:
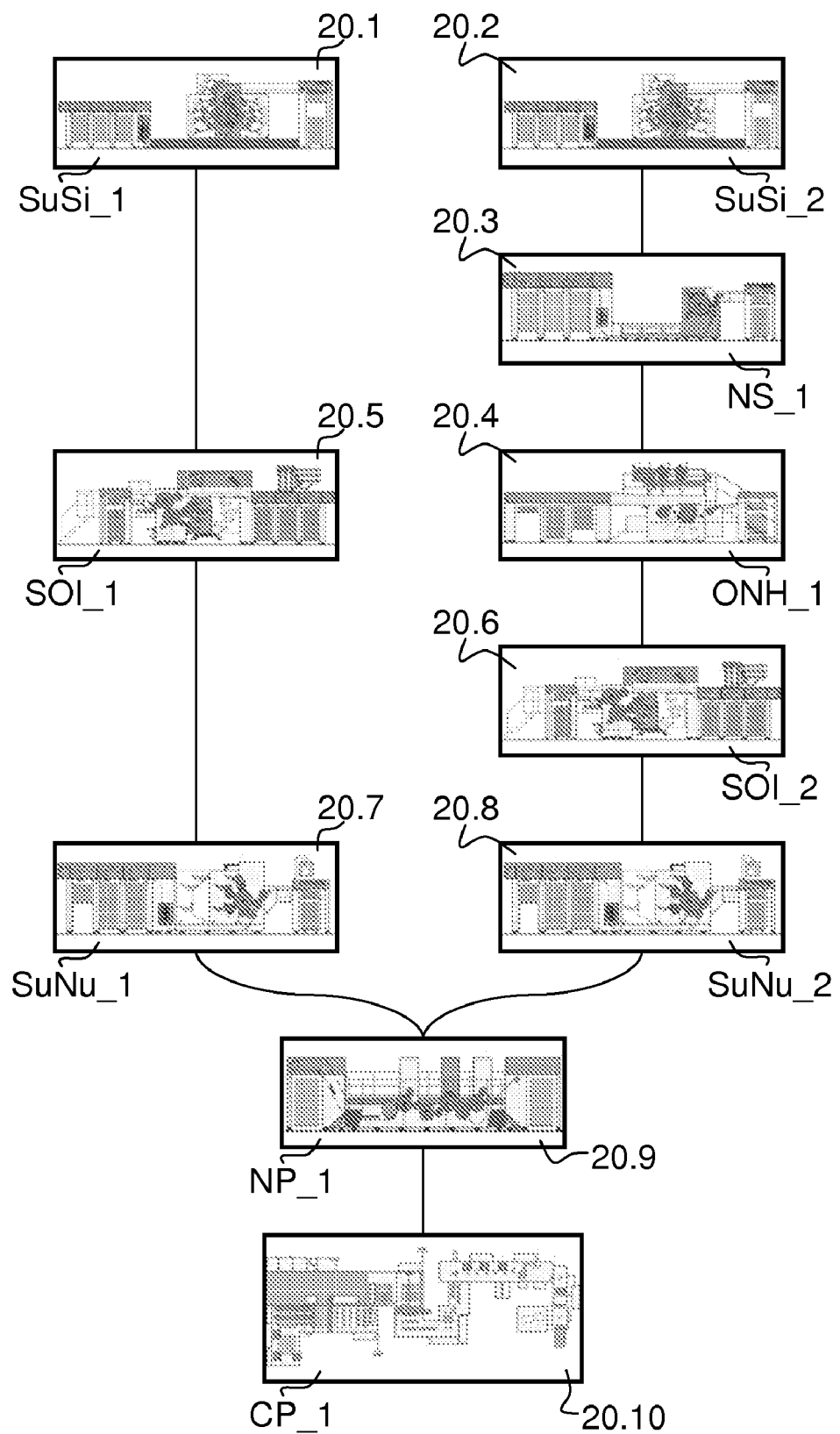
FIG. 4 is a schematic illustration of a possible production facility with ten distinct processing stations for carrying out the production of banknotes.

FIG. 4 schematically shows a purely illustrative and exemplary production facility including a plurality of distinct processing stations 20.1 to 20.10. These processing stations 20.1 to 20.10 are all coupled to a corresponding local computer station (not shown in FIG. 4), which local computer station can, as already mentioned, be an integral part of the computer interface equipment of each processing station. Preferably, each processing station will be given a specific station identifier (e.g. "SuSi_1", "SuSi_2", "NS_1", etc.) and network address within the system, such that it can be adequately declared in the system's computer network. In addition, a station type may advantageously be defined for each processing station (e.g. offset, intaglio, etc.). Such station type enables the system to automatically determine which operation the corresponding processing station can be used for.

Stations 20.1, 20.2 are for instance offset printing presses for simultaneous recto-verso printing of the sheets as described in particular in Swiss patent CH502 897, European patent application EP 0 949 069 a1 and International application WO 2007/042919 A2, WO 2007/105059 A1 and WO 2007/105061 A1, all in the name of the present Applicant. Such offset printing presses are sold by the present Applicant under the name Super Simultan®. Stations 20.1 and 20.2 will also be referred to hereinafter by station identifiers "SuSi_1" and "SuSi_2".

Station 20.3 is for instance a silk-screen printing press for printing iridescent and/or optically-variable ink (OVI) patterns onto the sheets as described in particular in European patent application EP 0 723 864 A1 and International applications WO 97/29912 A1, WO 97/34767 A1, WO 2004/096545 A2 and WO 2005/000585 A1, all in the name of the present Applicant. Such silk-screen printing presses are sold by the present Applicant under the name Nota Screen®. Station 20.3 will also be referred to hereinafter by station identifier "NS_1".

Station 20.4 is for instance a hot foil stamping press for applying optically-variable devices (OVD) by hot stamping, such as hologram patches, diffractive elements and the like, as described in particular in European patent application EP 0 965 446 A1and International applications WO 97/35721 A1, WO 97/35794 A1, WO 97/35795 A1, WO 97/36756 A1 and WO 2005/102733 A2, all assigned to the present Applicant. Such hot foil stamping presses are sold by the present Applicant under the name OptiNota H®. Station 20.4 will also be referred to hereinafter by station identifier "ONH_1".

Stations 20.5, 20.6 are for instance intaglio printing presses for single-side intaglio printing of the sheets as described in particular in European patent applications EP 0 091 709 A1, EP 0 406 157 A1, EP 0 873 866 A1, EP 1 602 483 A1 and International applications WO 03/047862 A1, WO 2004/069538 A2, WO 2004/069539 A2, WO 2004/101282 A1, WO 2005/077656 A1, WO 2005/090088 A1, WO 2005/102728 A1, WO 2005/118294 A1 and WO 2007/060615 A1, all in the name of the present Applicant. Such intaglio printing presses are sold by the present Applicant under the name Super Orlof Intaglio®. Stations 20.5 and 20.6 will also be referred to hereinafter by station identifiers "SOI_1" and "SOI_2".

Stations 20.7, 20.8 are for instance letterpress printing presses for carrying out numbering of the sheets as described in particular in European patent application EP 0 061 795 A1 and International applications WO 03/099579 A1, WO 2005/008605 A1, WO 2005/008606 A1, WO 2005/123415 A1, WO 2006/129245 A2 and WO 2007/060624 A1, all in the name of the present Applicant. Such numbering presses are sold by the present Applicant under the name Super Numerota®. Stations 20.7 and 20.8 will also be referred to hereinafter by station identifiers "SuNu_1" and "SuNu_2".

Station 20.9 is for instance a varnishing machine for applying a protective layer to both side of the sheets. Such varnishing machine may make use of flexographic printing technology to apply the layers of varnish and are sold by the present Applicant under the name Nota Protector®. Station 20.9 will also be referred to hereinafter by station identifier "NP_1". While station 20.9 is shown as being located downstream of the numbering stations 20.7, 20.8, it shall be appreciated that, depending on the production requirement, varnishing could be performed before numbering.

Lastly, station 20.10 is for instance a finishing machine for carrying out cutting of the sheets into individual banknotes, bundling of the banknotes into banknote bundles and packing of the banknote bundles into bundle packs as in particular described in U.S. Pat. Nos. 3,939,621, 4,045,944, 4,453,707, 4,558,557 and European patent applications EP 0 656 309 A1, EP 1 607 355 A1, all in the name of the present Applicant. A latest example of such finishing machine is also described in European patent application No. 06117273.0 entitled "PROCESSING OF STACKS OF SHEETS OF SECURITIES INTO BUNDLES AND PACKS OF BUNDLES" filed on Jul. 14, 2006 in the name of the present Applicant, which application was published as EP 1 878 679 A1. Such finishing machines are sold by the present Applicant under the name CutPak®. Station 20.10 will also be referred to hereinafter by station identifier "CP_1".

As schematically illustrated in FIG. 4, stations 20.1 to 20.8 may be physically organized into two partly separate production lines with stations 20.1, 20.5 and 20.7 forming a first one of said production lines and stations 20.2, 20.3, 20.4, 20.6 and 20.8 forming a second one of said production lines. In this example, both production lines share the same varnishing station 20.9 and finishing station 20.10.

The above-described printing plant architecture and organisation are purely illustrative and will be referred to hereinafter for the purpose of explanation only. It shall already be understood that the actual location of the respective processing stations does not as such bear much relevance as any one of the above-discussed stations could form part of a particular production scheme. What basically matters within the scope of the present invention is not the actual location of each station, but rather the function each station is meant to fulfil and the available functionalities and capabilities of each station to carry out a given production step. Moreover, only part of the equipment illustrated in FIG. 4 might be exploited within the context of a given production order.

Figure 5:
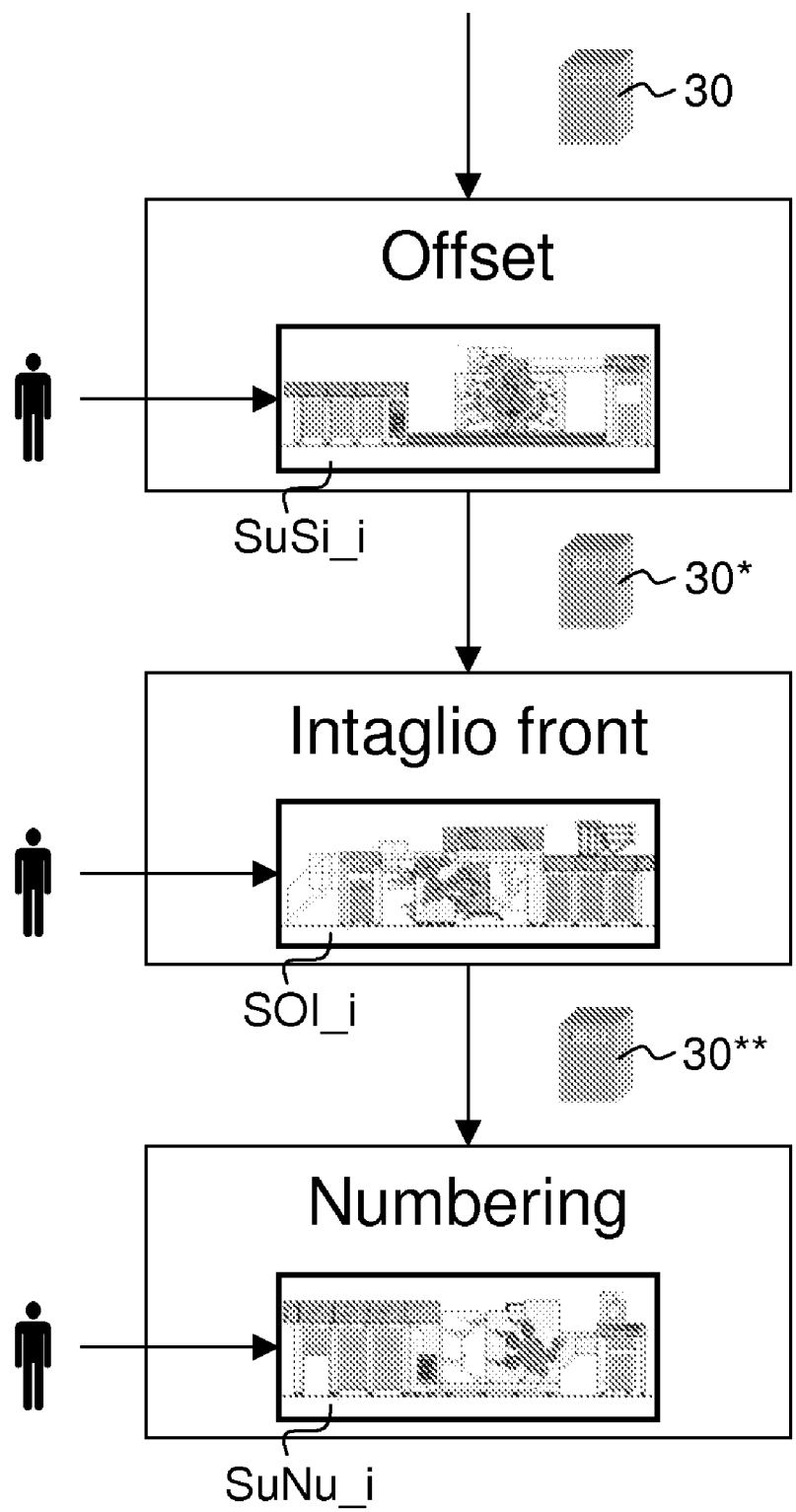
FIG. 5 is a schematic diagram illustrating some of the elements involved in the production process of the invention according to an exemplary situation where production loads are subjected to three successive production steps.

FIG. 5 is a diagram illustrating some of the elements involved in the production process of the invention according to an exemplary workflow situation where loads 30, 30\*, **30\*\* are subjected to three successive production steps (or "workflow steps"), namely an offset printing step whereby the sheets are printed on both side by offset printing, followed by an intaglio printing step whereby the sheets are printed on the front side thereof by intaglio printing and a numbering step whereby the sheets are numbered. The offset printing step may be carried out on at least one corresponding offset printing press, such as station 20.1 or 20.2 in FIG. 4, while the intaglio printing step may be carried out on at least one corresponding intaglio printing press, such as station 20.5 or 20.6 in FIG. 4. Similarly, the numbering step may be carried out on at least one corresponding numbering press, such as station 20.7 or 20.8 in FIG. 4**. It will be understood that a human operator, namely a printer, will be operating each processing station taking part to the production, as usual, which human operator will carry out the handling of the loads at the machine location.

Figure 6A:
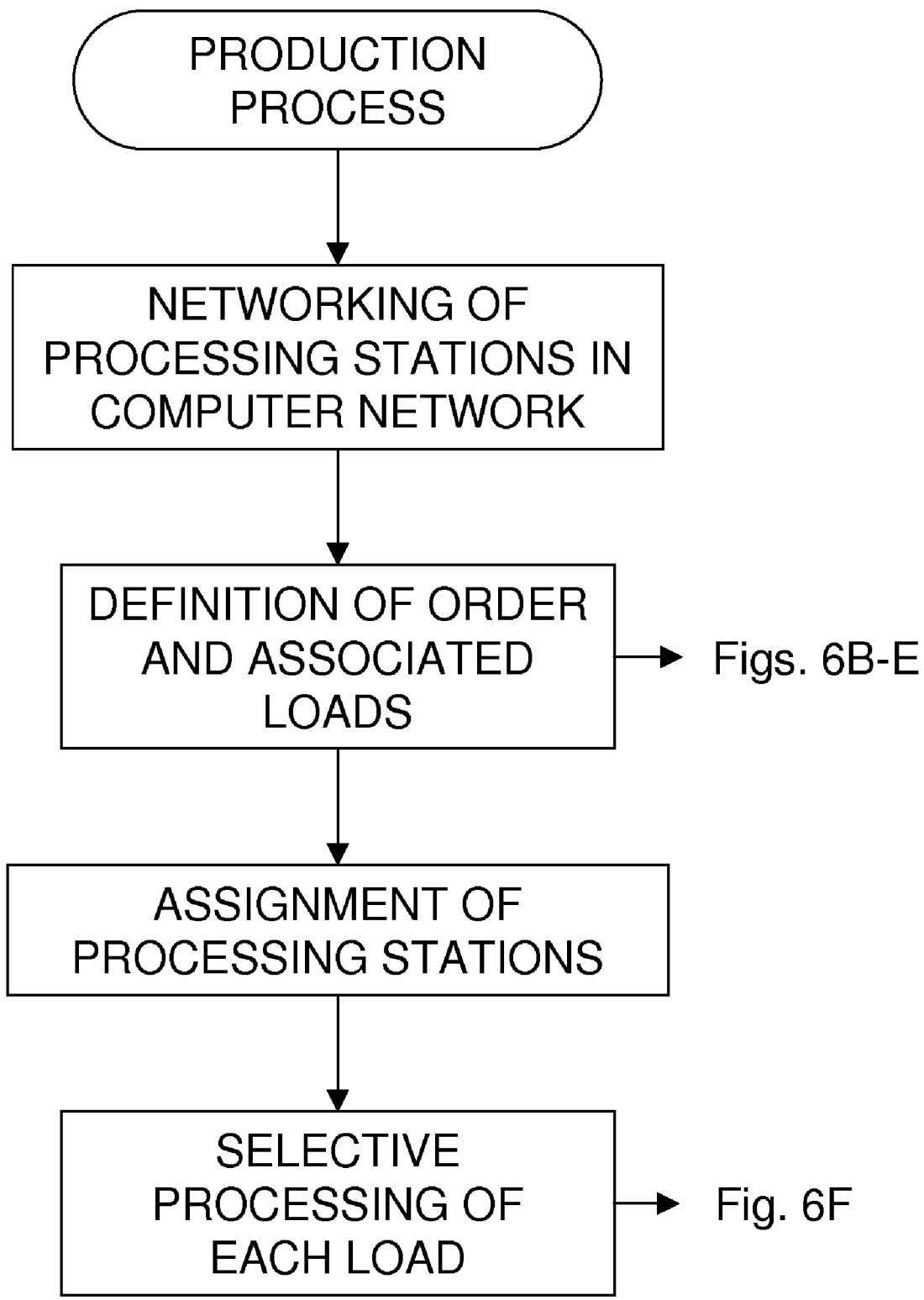
FIG. 6A is a flow chart summarizing the general inventive concept underlying the controlled production process according to the invention.

One will now turn to FIGS. 6A to 6F for a description of a preferred embodiment of the production methodology according to the present invention. FIG. 6A is a flow chart summarizing the general inventive concept underlying the controlled production process according to the invention. Such production process involves, as a preliminary step which has already been described in connection with FIGS. 1 and 2, the computer networking of the processing stations of the printing plant with local computer stations and a central server station, one local computer station being operatively coupled to each processing station. As already mentioned, each processing station is declared and identified in the network by its corresponding station identifier and network address.

In a second preparatory step, at least one production order (or simply "order") is defined, which production order involves the production of a desired volume of security documents according to a determined production scheme (or "workflow"), this production order being subdivided into a plurality of production loads. In more general terms, an "order" may be defined as a quantity of products (whether quantified in number of sheets or security documents) that need to be produced, and a "workflow" may be defined as a sequence of mandatory processing steps that need to be carried out to produce the products. In other words, an "order" uses a "workflow" to say how many and which production steps (or "workflow steps") are needed. Any number of different orders may use the same workflow. One will further understand that the total quantity of products to produce for any given order is split into loads that are part of and unique to that order.

This second preparatory step will be described in greater detail in reference to FIGS. 6B to 6E. As schematically illustrated by the flow chart of FIG. 6B, the definition of each production order is preferably carried out in the following manner. First, a new order entry is created in the system, which entry might be identified in the system by an appropriate order identifier and order description. Next, the order parameters are defined. These order parameters in particular include the desired volume of security documents to be produced, preferably expressed in number of sheets. This value is set so as to be larger than the required number of good sheets that have to be produced taking into account an expected wastage. In addition to the number of sheets to be produced, the order parameters may further include a definition of the maximum number of sheets per load, i.e. the maximum number of sheets that can be present in any load derived for that order. This value (e.g. 7,500 to 10,000 sheets) is used as initial load size when loads are created for that order. Once these tasks have been performed, a corresponding production workflow needs to be associated to the order. This workflow determines the actual sequence of mandatory production steps that the order, or more precisely each load composing this order, has to follow in order to produce security documents with the desired features.

Figure 6C:
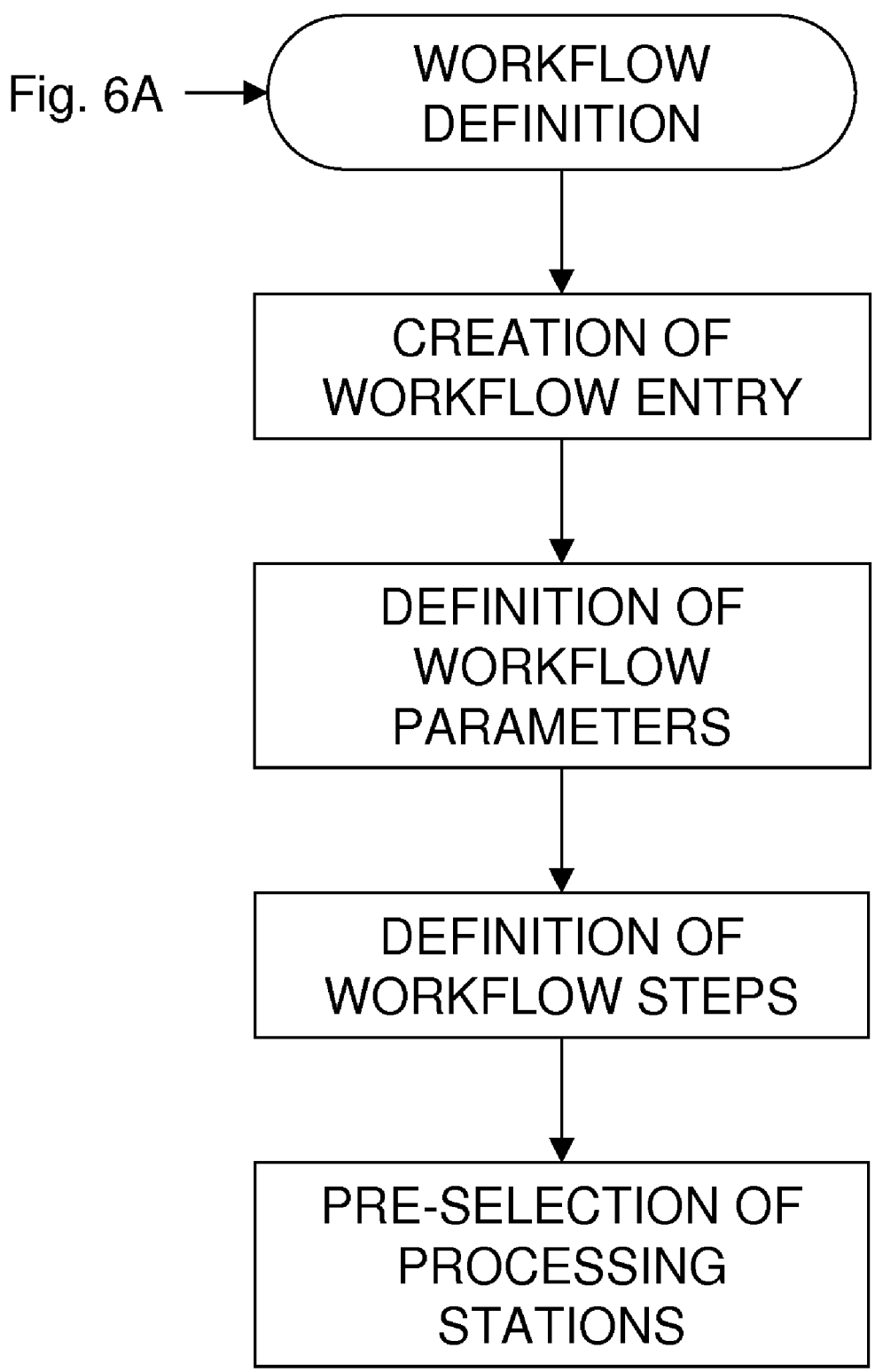
FIG. 6C is a flow chart illustrating a workflow definition process whereby a production workflow is created.

The process of defining a workflow will be briefly described in reference to FIG. 6C which is a flow chart summarizing the workflow definition/creation process. In a first step, a new workflow entry is created in the system, which entry might similarly be identified in the system by an appropriate workflow identifier and workflow description. Next, workflow parameters may be defined. Such parameters may for instance include a value representative of relative substrate cost, i.e. a value that is used as a basis for determining sheet cost and its evolution throughout the production process. Next, workflow steps are defined, i.e. the sequence of mandatory production steps that need to be carried out are defined. For each of these workflow steps, a value representative of relative added cost, i.e. a value representative of the relative costs added as a result of each workflow step, may advantageously be provided. In such a way, it is possible to provide an estimation of the evolution of the costs throughout the production process, which estimation enables a financial quantification of production efficiency. It is to be understood that relative added cost may be null and depends on the actual operations carried out during each step and the "materials" involved (e.g. consumables such as printing inks, stamping foils, etc.). Lastly, at least one processing station is pre-selected for carrying out each of the workflow steps. As this will be appreciated from the following description, there might be more than one processing station for carrying out a given workflow step. This pre-selection step enables the system to know which one of the available processing stations could potentially be used in the context of a given order and workflow.

FIG. 6D is a flow chart illustrating the process of load definition. It is assumed in this case that at least one production order has already been created and defined in the system. In a first step, a desired order is selected from a list of previously-defined orders. Next, production loads are created in a sequential manner and a machine-readable load identifier is generated for each thus created load. It shall be appreciated that each created load is part of and unique to the selected order. As already mentioned hereinabove in reference to FIG. 6B, a default initial load size may advantageously be defined in the order parameters, which load size is exploited when creating the loads.

As already mentioned, the machine-readable load identifier may be a barcode tag, which barcode tag may for instance be printed together with additional information (such as information about the order, the workflow and workflow steps, and/or the associated load processing state) on at least one printed label or sheet that is kept together with the associated load. For the sake of redundancy and security, such a label or sheet may be printed in several copies and affixed or held at different locations of a given load. For example, at least one adhesive label bearing the barcode tag may be stuck to a convenient place of the associated load (such as on the palette carrying the load or on part of a container housing the load), while a sheet carrying the same barcode tag and additional information may be provided at a location easily accessible to an operator. Any other suitable machine-readable identifying technology might be used, such as RFID technology for example.

Figure 6E:
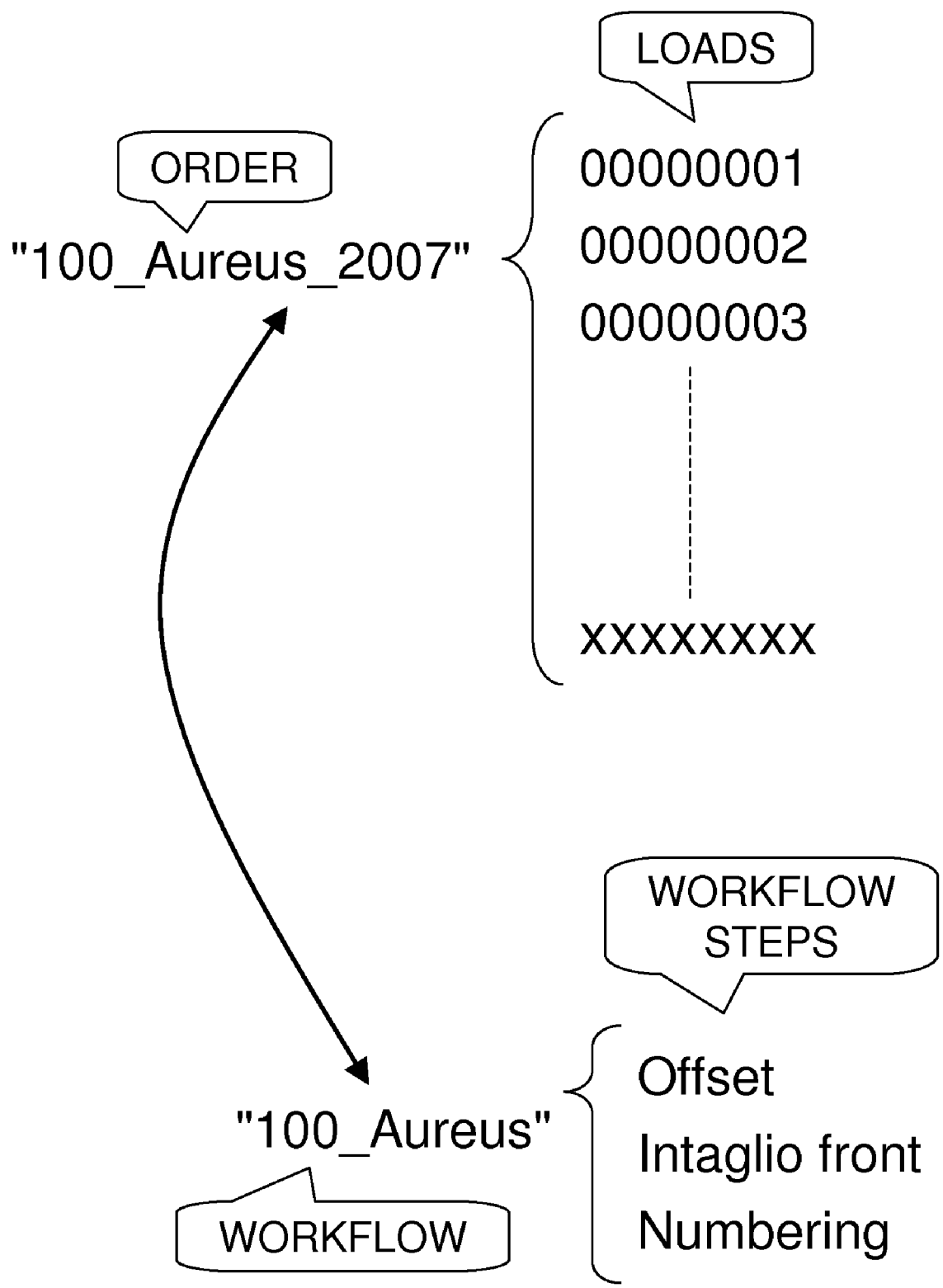
FIG. 6E illustrates the concepts of "order", "loads", "workflow" and "workflow steps" in the context of an exemplary order and workflow.

FIG. 6E illustrates the above-mentioned concepts of "order", "loads", "workflow" and "workflow steps" in the context of an exemplary order and workflow case. As already mentioned, an "order" is defined as a quantity of products (whether quantified in number of sheets or security documents) that need to be produced. In FIG. 6E, such order is defined and identified for the purpose of illustration by the order identifier "100_Aureus_2007". This order is split into a plurality of loads each bearing a corresponding machine-readable load identifier (e.g. "00000001", "00000002", "00000003", etc.). All these loads are part of and unique to the order "100_Aureus_2007".

How the order and its corresponding loads should be produced is defined by its associated workflow. In FIG. 6E, this workflow is identified by the workflow identifier "100_Aureus" and is defined as consisting of the same three successive mandatory processing workflow steps as illustrated generally in FIG. 5, namely steps designated "Offset", "Intaglio front" and "Numbering". In this example, one shall accordingly understand that the defined workflow "100_Aureus" involves three production steps carried out in sequence whereby the sheets are first printed by offset printing on both sides, then printed on the front by intaglio printing and lastly numbered. This exemplary workflow is of course purely illustrative and may in particular include more than three steps.

A further refinement to the order definition process may optionally include the definition of so-called "derived workflows" and "jobs", which refinement will be discussed at a later stage in reference to FIGS. 10A to 10C. For the time being, let us turn back to FIG. 6A for a description of the remaining steps of the production process. Once the order and associated loads (including the corresponding workflow(s)) have been defined as explained above, one proceeds to a third preparatory step wherein the processing stations required to process the order are assigned (this third preparatory step may be designated as "station assignment"). This step is required in order for the system to know which stations among the installed base of processing stations have been configured to participate to a given order and workflow and will be used to carry out the processing of the order. This step is carried out once a station has been set up for production, the person responsible informing the system what the station is prepared to print or process. Once this process is performed, the system can then determine which loads are eligible for a given processing station and which are not. It shall be appreciated that this assignment step is to be distinguished from the pre-selection step of FIG. 6C where the stations were previously pre-selected for each workflow step as potential processing stations. At the time of such pre-selection, the corresponding processing stations are not necessarily set up and configured to carry out the required order (these stations might for instance still be configured to process another order).

Station assignment may be performed in different ways. A first possibility may consist in assigning the processing station to a selected order. In this way, the station will only accept loads defined for this particular selected order. Another possibility may consist in assigning the processing station to a selected workflow within the order. In this way, and assuming that more than one workflows have been defined for a given order, the station will only accept loads defined to be processed according to the selected workflow. A third possibility may consist in assigning the processing station to a selected job within the order. In this way, the station will only accept loads defined for this particular selected job, and not loads defined for other jobs of the same order.

During the station assignment, at least one processing station to carry out the corresponding workflow step is assigned. Various station assignments are possible depending on the actual installed base of processing equipment and actual configuration of such equipment. Let us consider for the sake of illustration the exemplary printing plant organisation which was discussed in reference to FIG. 4. Any one of the two offset printing presses SuSi_1, SuSi_2 of FIG. 4 (i.e. stations 20.1, 20.2) could be exploited to carry out the first offset printing step of workflow "100_Aureus" of FIG. 6E. Similarly, any one of the two intaglio printing presses SOI_1, SOI_2 (i.e. stations 20.5, 20.6) and of the two numbering presses SuNu_1, SuNu_2 (i.e. stations 20.7, 20.8) of FIG. 4 could be exploited to carry out the second and third steps, respectively, of workflow "100_Aureus" shown in FIG. 6E. Such stations could be pre-selected at the time of the workflow definition process (last step of FIG. 6C) and formally assigned to participate to the order (penultimate step of FIG. 6A) once they have been configured accordingly. In the context of this preferred embodiment, it shall be appreciated that a processing station may only be assigned to carry out a given workflow step if it has previously been pre-selected to carry out such workflow step during the workflow definition process.

Once the above preparatory steps have been effected, each created production load can be processed selectively through the appropriate processing stations depending on the defined production workflow of the corresponding production order to which the load belongs. Prior to being processed on a selected processing station among the available processing stations, each production load is first subjected to a load acceptance procedure based on its corresponding machine-readable load identifier. Such load acceptance procedure ensures that the correct load is processed at the correct location and at the correct time throughout the production. Each time a production load is processed and its production state is changed, the load status is updated in the system such that the system can keep track of the status of each production load defined in the system.

Figure 6F:
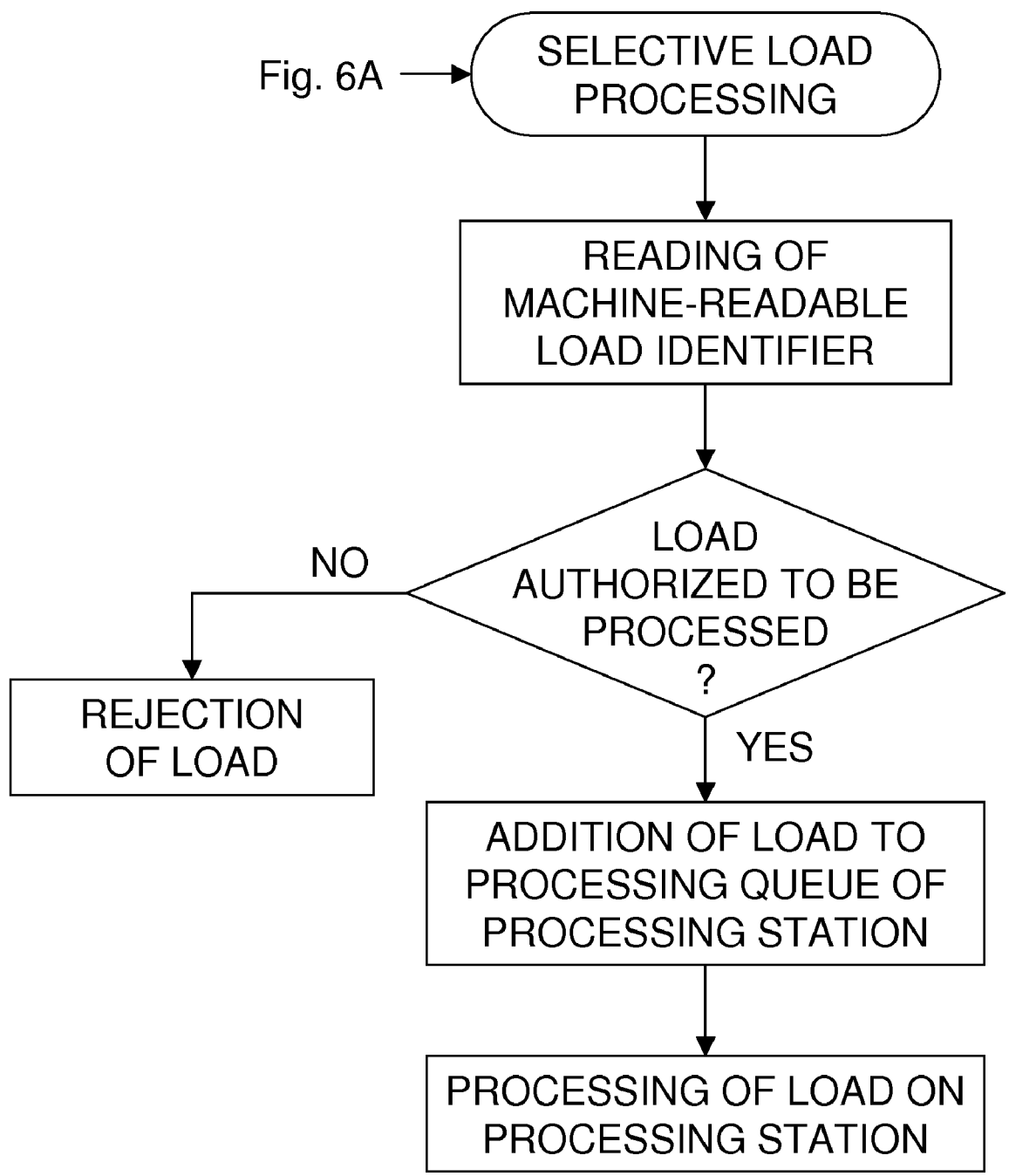
FIG. 6F is a flow chart illustrating the selective load processing of a load on a processing station.

FIG. 6F is a flow chart summarizing how selective load processing is carried out according to the preferred embodiment of the invention. In a first step, the machine-readable load identifier of the production load is read at the selected processing station where the production load is supposed to be processed. Provided adequate tagging technology is used, such reading may for instance be carried out at the location of the selected processing station using a hand-held scanning device, such as an optical barcode reader or RFID reader. Using the local computer station to which the hand-held scanning device is connected, it is checked, on the one hand, whether the selected processing station has been assigned (and configured accordingly) to carry out processing of the load and, on the other hand, whether the production state of the load is such that the load can indeed be processed on the selected processing station. In the negative, processing of the load is rejected. In the affirmative, the load is added to the processing queue of the processing station. The loads thus queued are then processed in sequence through the processing station, under the usual control of the operator operating the equipment. The production state of each production load is updated in the system each time the status of the load is changed.

Preferably, the system is designed to record the load processing history of each load, i.e. the history of which processing steps each load has gone through. Such load processing history would typically reflect the workflow structure that the load is defined to follow. In such a way, the system can determine and calculate the status of each load on-the-fly. On may alternatively provide for the transmittal to the central server station of specific load status descriptors from any given processing station each time a load state is changed.

The station identifier of the station onto which a given load has been queued for processing may conveniently be communicated to the central server station once the given load has passed the load acceptance procedure. The identity of the operator to which load responsibility has been handed off may be derived, if required, from user-logging data of the corresponding station identifier. In this way, the system can tell at which location the load is awaiting processing and shall be processed and to which person responsibility of the load has been handed off.

Once a given load has been fully processed on a given processing station, information regarding the execution of the corresponding production step is sent to the system. Such information preferably includes the number of good sheets and waste sheets, as well as the time required for processing the load, and/or any other information required for reporting and monitoring purposes.

The above-mentioned data is preferably collected at each processing location and stored locally in case the central server station is off-line. Data can be transmitted to the central server station when the latter is on-line.

Figure 7A:
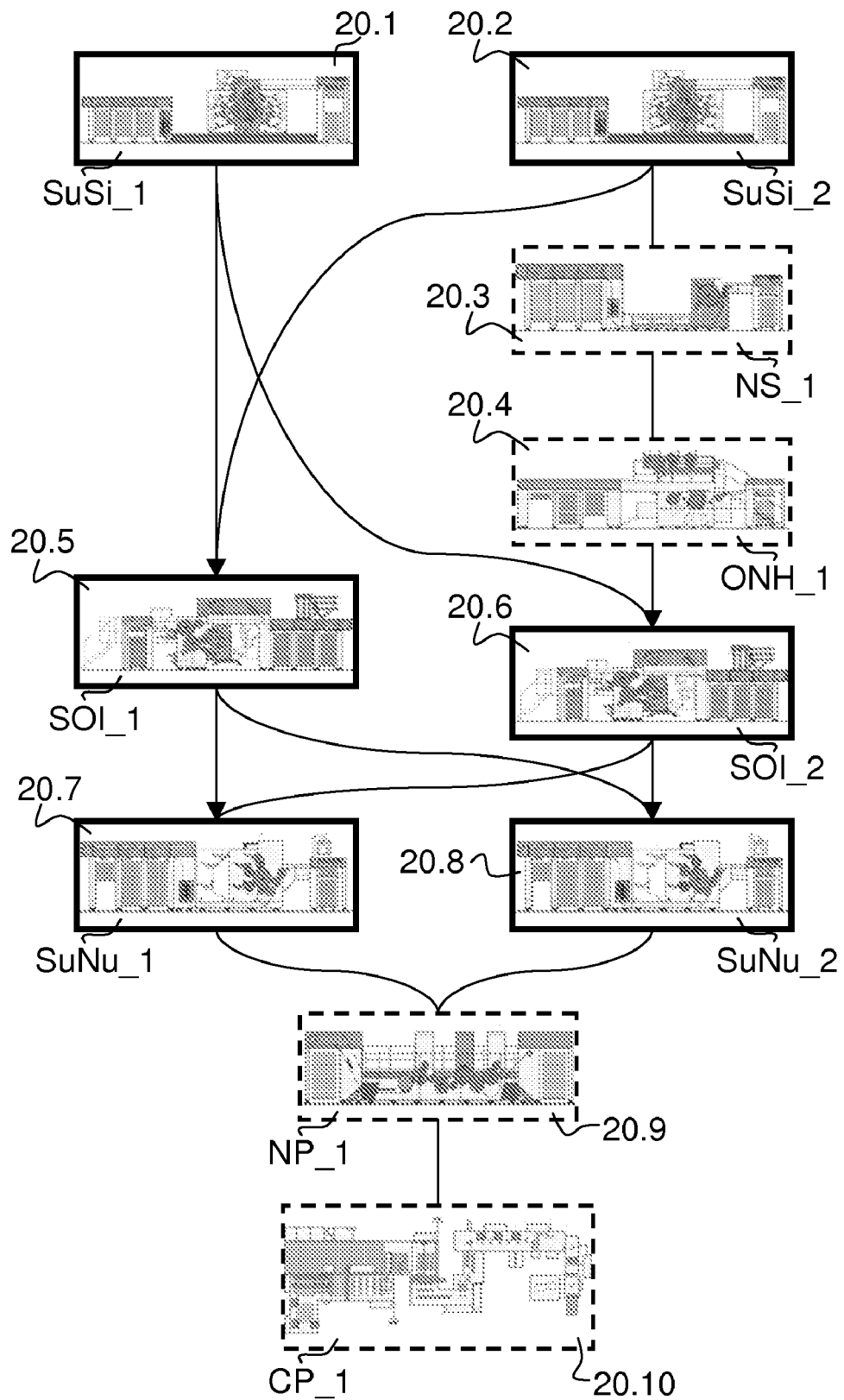
FIGS. 7A and 7B are schematic diagrams illustrating a possible implementation of the workflow of FIG. 5 using all available equipment resources of FIG. 4.
Figure 7B:
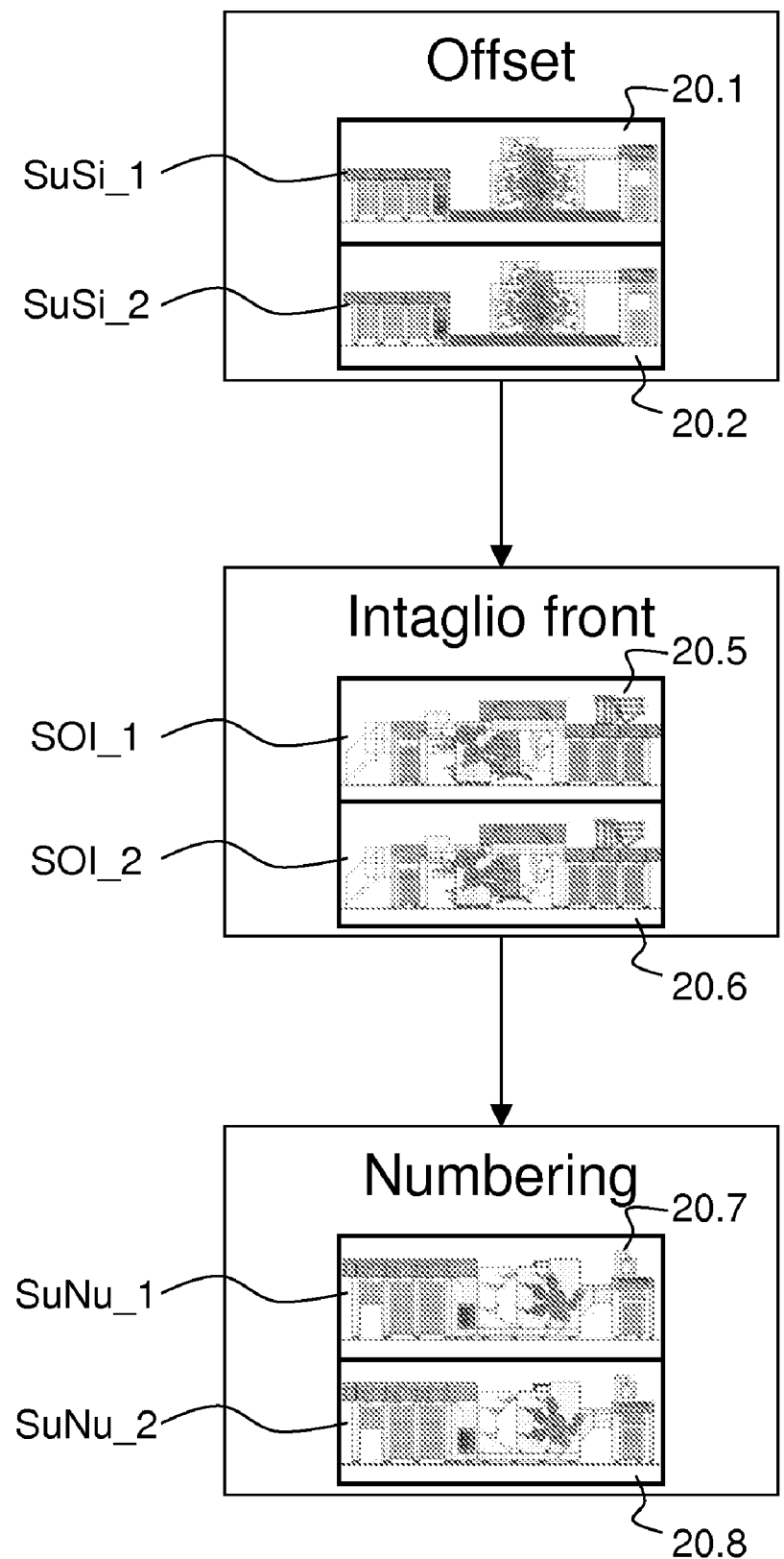

FIGS. 7A and 7B illustrate an example where workflow "100_Aureus" illustrated in FIG. 6E is carried out by exploiting all available resources of FIG. 4 for performing the required workflow steps, i.e. "offset", "intaglio front" and "numbering". In such case, as schematically illustrated in FIG. 7B, two processing stations are accordingly pre-selected and assigned to carry out each workflow step. As illustrated in FIG. 7A, the loads may therefore follow different routes (or physical routing) through the assigned stations, i.e. stations 20.1, 20.2, 20.5, 20.6, 20.7 and 20.8.

Figure 8A:
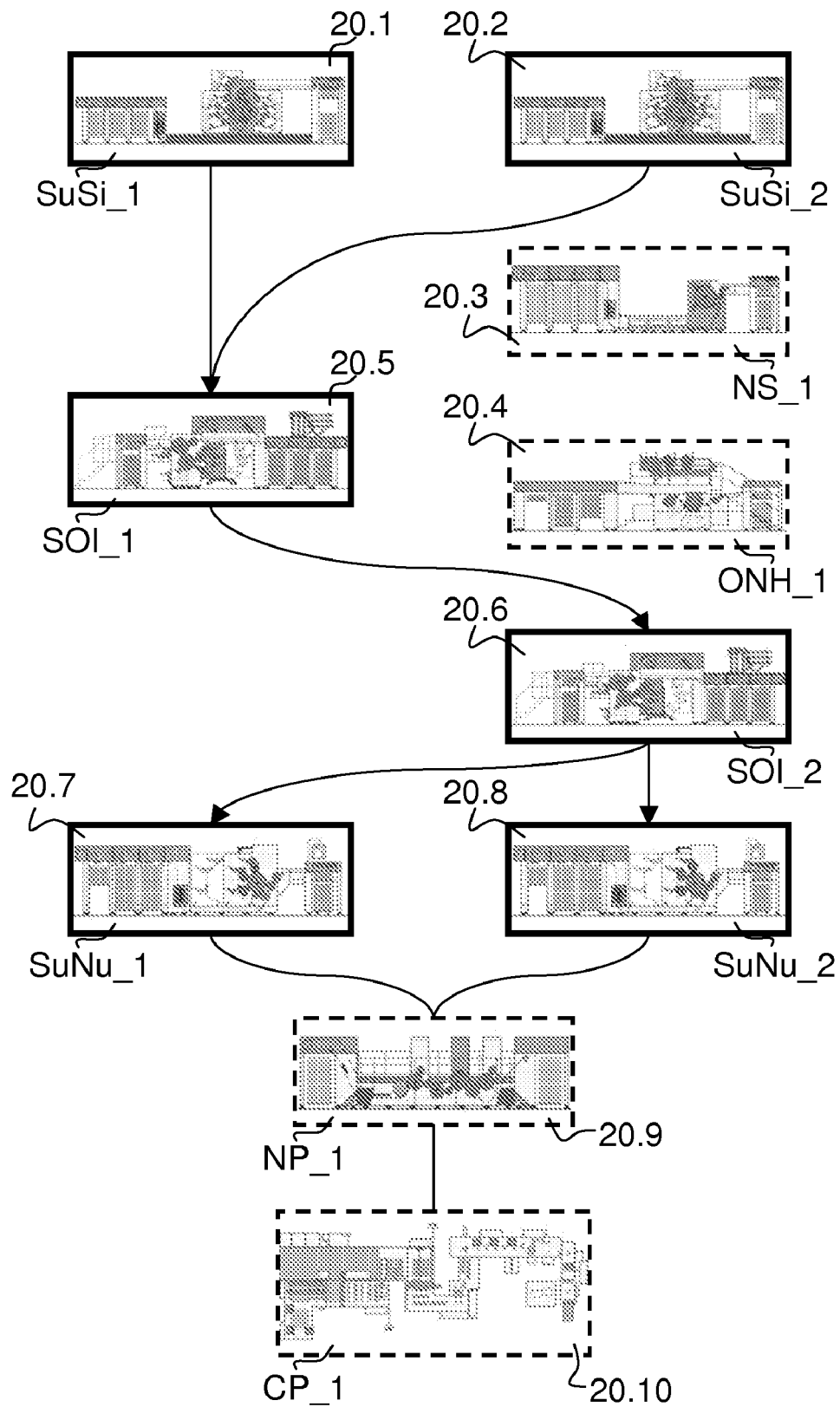
FIGS. 8A and 8B are schematic diagrams illustrating a possible implementation of another exemplary workflow including four successive workflow steps using the equipment resources of FIG. 4.
Figure 8B:
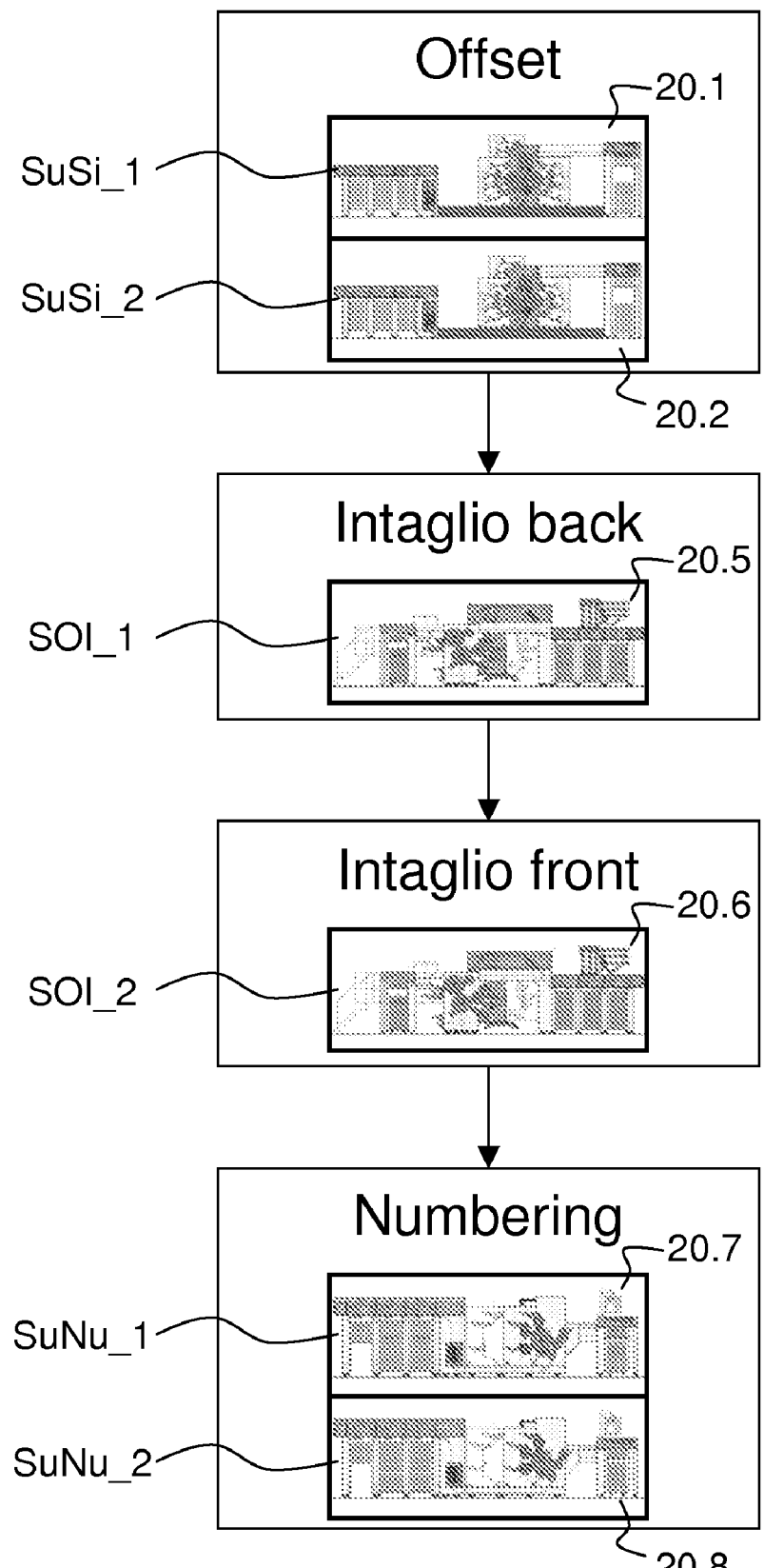

FIGS. 8A, 8B and 9A, 9B illustrate another workflow example wherein the actual workflow involves four successive processing steps, i.e. (i) an offset printing step whereby the sheets are printed on both sides by offset printing, (ii) a first intaglio printing step whereby the sheets are printed on their back side by intaglio printing, (iii) a second intaglio printing step whereby the sheets are printed on their front side by intaglio printing, and (iv) a numbering step whereby the sheets are numbered. In the example of FIGS. 8A, 8B, both offset printing presses 20.1, 20.2 as well as both numbering presses 20.7, 20.8 are again assigned to carry out the offset printing step and the numbering step, respectively. One intaglio printing press, namely press 20.5, is exclusively assigned to carry out the first intaglio printing step (i.e. the "intaglio back" step), while the other intaglio printing press, namely press 20.6, is exclusively assigned to carry out the second intaglio printing step (i.e. the "intaglio front" step). The possible physical routings through the corresponding stations are shown in FIG. 8A, there being in this case only one possible routing to carry out the intaglio printing steps.

Figure 9A:
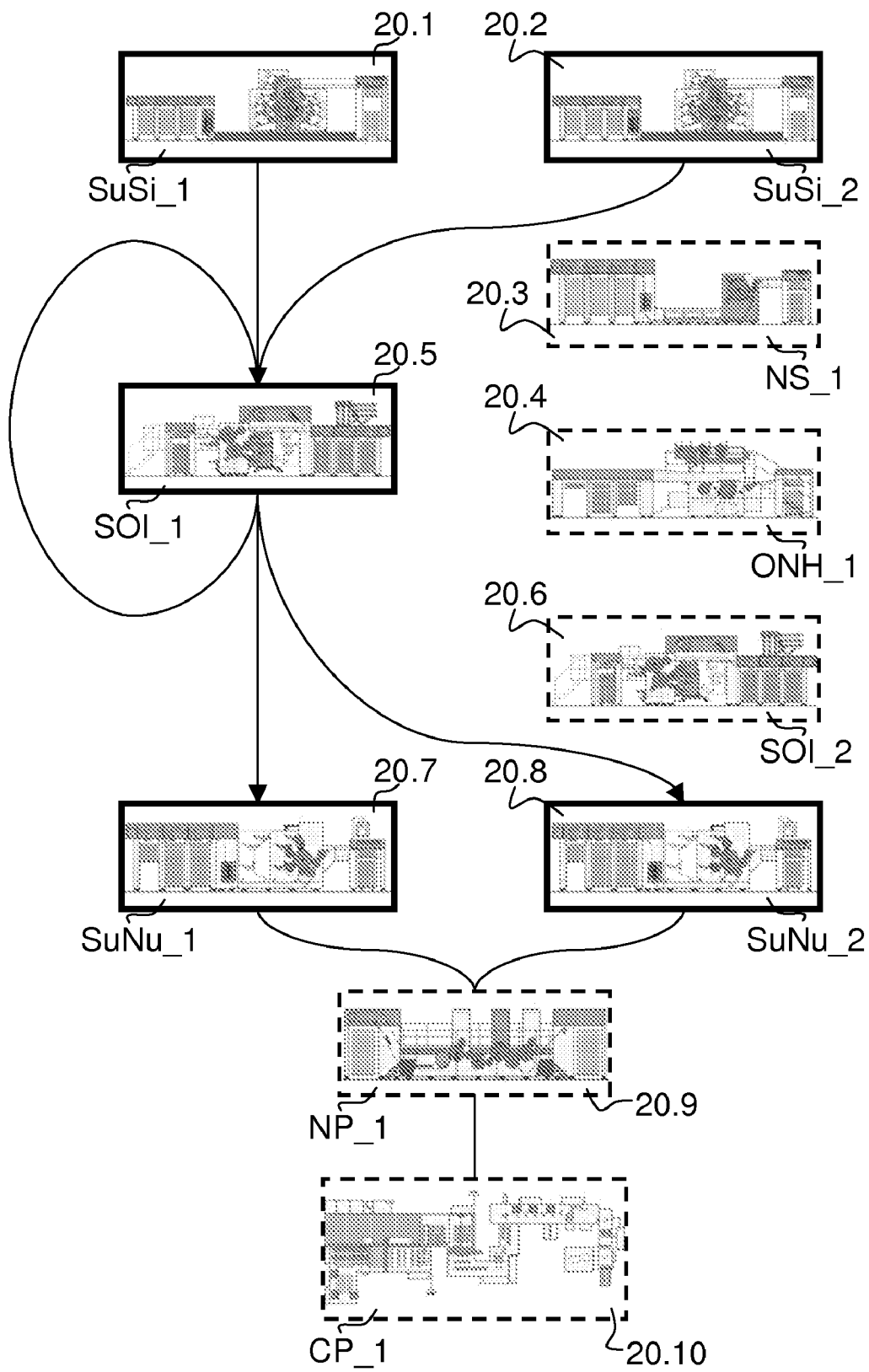
FIGS. 9A and 9B are schematic diagrams illustrating a possible implementation of the same exemplary workflow as illustrated in FIG. 8B using different equipment resources.
Figure 9B:
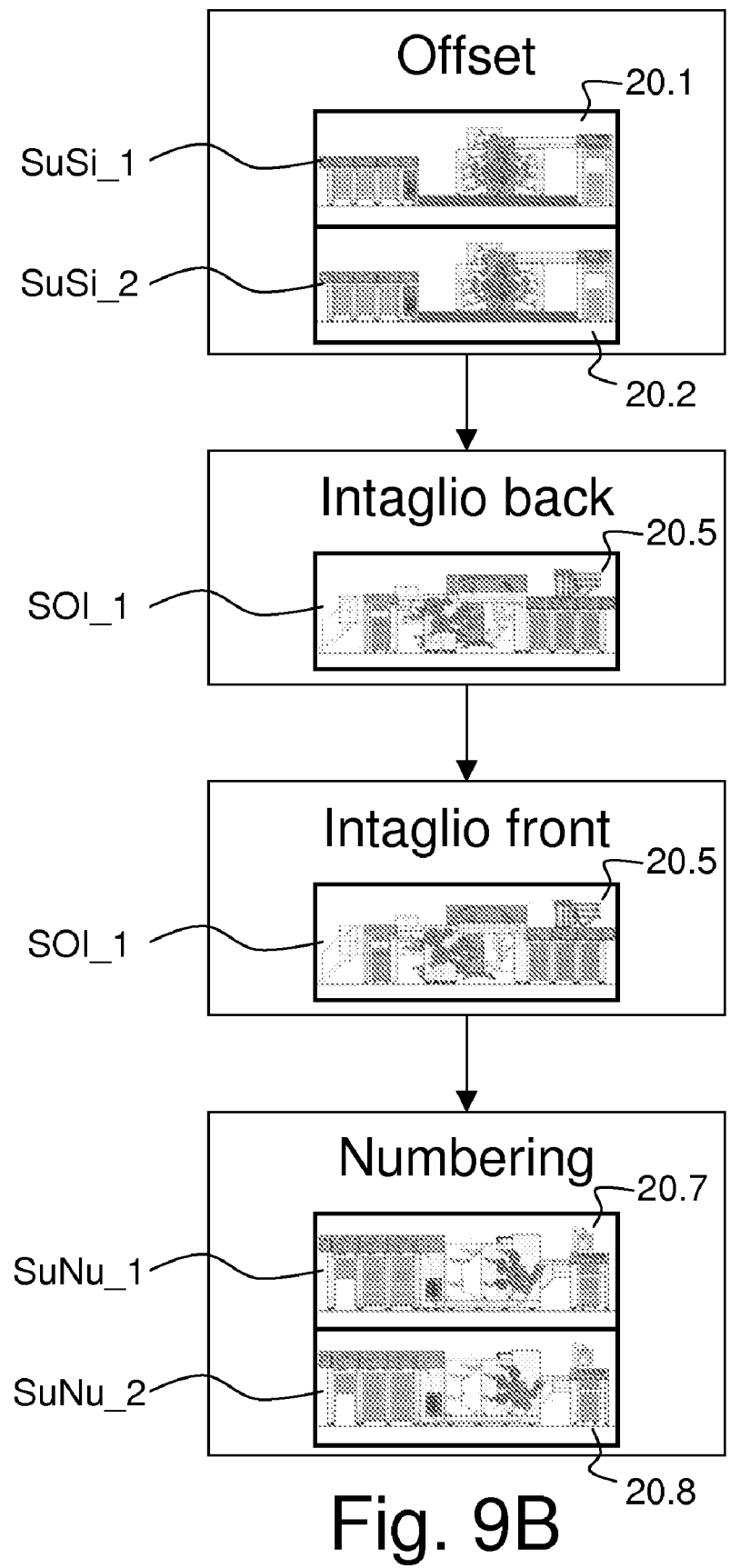

FIGS. 9A, 9B show a similar workflow situation, though with a different station assignment. In this other example, one of the two intaglio printing presses, namely press 20.6, is not at all assigned to carry out any step of the workflow (such station 20.6 may accordingly be made available to process a different order). The remaining intaglio press, namely press 20.5 is assigned in this case to carry out two successive steps, namely the "intaglio back" and "intaglio front" steps. This obviously requires in such case a set-up change of press 20.5 between the two successive intaglio steps and, consequently, a particular chronological routing of the loads, i.e. station 20.5 must first be configured to carry out the "intaglio back" step and then re-configured to carry out the "intaglio front" step. During such a set-up change, the loads would typically be stored in a corresponding storage vault or safe, as already mentioned hereinabove in relation to FIG. 2. While such intermediate storage step is not specifically defined in the workflow of FIG. 9B, such could perfectly be the case if necessary by providing an additional workflow step between the "intaglio back" and "intaglio front" steps. The same could be undertaken in the context of the workflow of FIG. 8B, i.e. an intermediate workflow step consisting of a temporary storage of the loads between the two successive intaglio steps could be provided. If required, one may even provide for the intermediate storage of loads in storage vaults as a standard and systematic measure between each workflow step, which intermediate operations may or may not be specifically defined in the production workflow.

Figure 10A:
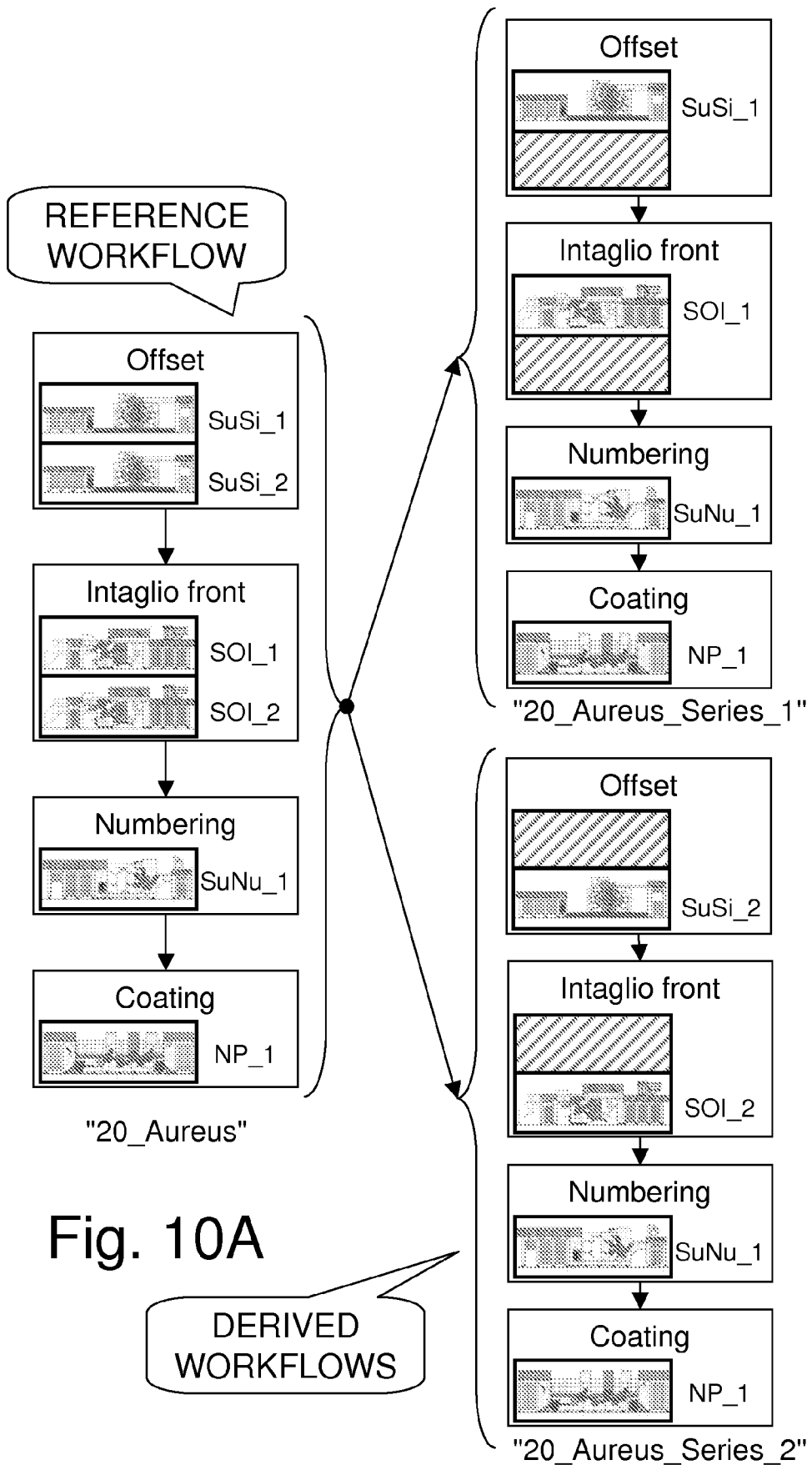
FIG. 10A is a schematic diagram illustrating the concept of "derived workflows"

FIG. 10A illustrates the concept of "derived workflow" that could advantageously be implemented as a further option. Sometimes, it is desirable to use a variation of a workflow (referred to as "derived workflow") to make loads follow a determined path through the processing stations. The example of FIG. 10A shows a reference workflow for a hypothetical "20_Aureus" denomination and two derived workflows designated by workflow identifiers "20_Aureus_Series_1" and "20_Aureus_Series_2". In this example, the loads can be processed in any one of the two offset printing stations "SuSi_1", "SuSi_2", but once a load has been processed on one of these stations, it can only be processed further in the stations indicated in the corresponding derived workflows. For instance, if a load goes through station "SuSi_1", it can only be processed further through stations "SOI_1" and then "SuNu_1" and "NP_1". Conversely, if a load goes through station "SuSi_2", it can only be processed further through stations "SOI_2" and then "SuNu_1" and "NP_1".

The advantage of the above refinement will be understood from the following description. Let us assume for the sake of illustration that one wishes to produce two series of banknotes of a same denomination, but that such two series have slightly distinct features, for example slightly different offset patterns, intaglio patterns and numberings. As illustrated by the diagram of FIG. 10B, a common order might be defined for both series, which order is identified by the identifier "20_Aureus_2007", this order being subdivided in as many loads as necessary. Associated to this order "20_Aureus_2007" is defined a corresponding reference workflow identified by the identifier "20_Aureus". For the sake of explanation, it will be assumed that this reference workflow is the one illustrated in FIG. 10A where stations "SuSi_1", "SuSi_2", "SOI_1", "SOI_2", "SuNu_1" and "NP_1" (i.e. stations 20.1, 20.2, 20.5, 20.6, 20.7 and 20.9 in FIG. 4) have been pre-selected as potential participating stations. One will understand in this example that stations "SuSi_1" and "SuSi_2" have been pre-selected to carry out a first offset step, "SOI_1" and "SOI_2" to carry out a subsequent intaglio front step, "SuNu_1" to carry out a subsequent numbering step and "NP_1" to carry out a coating step (e.g. varnishing of both sides of the sheets).

Figure 10B:
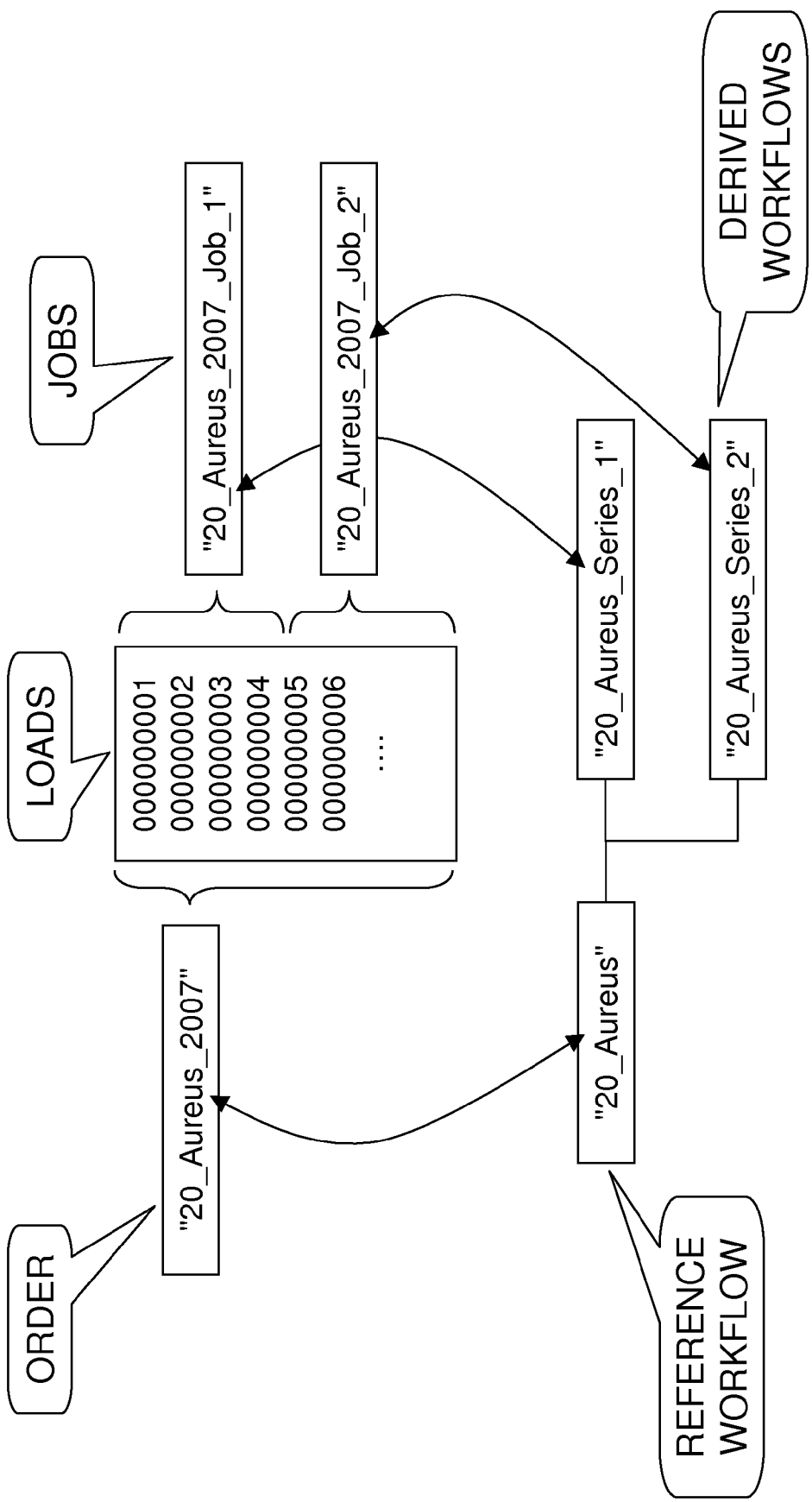
FIG. 10B illustrates the additional concepts of "jobs" in the context of the same exemplary reference workflow and derived workflows as illustrated in FIG. 10A.
Figure 10C:
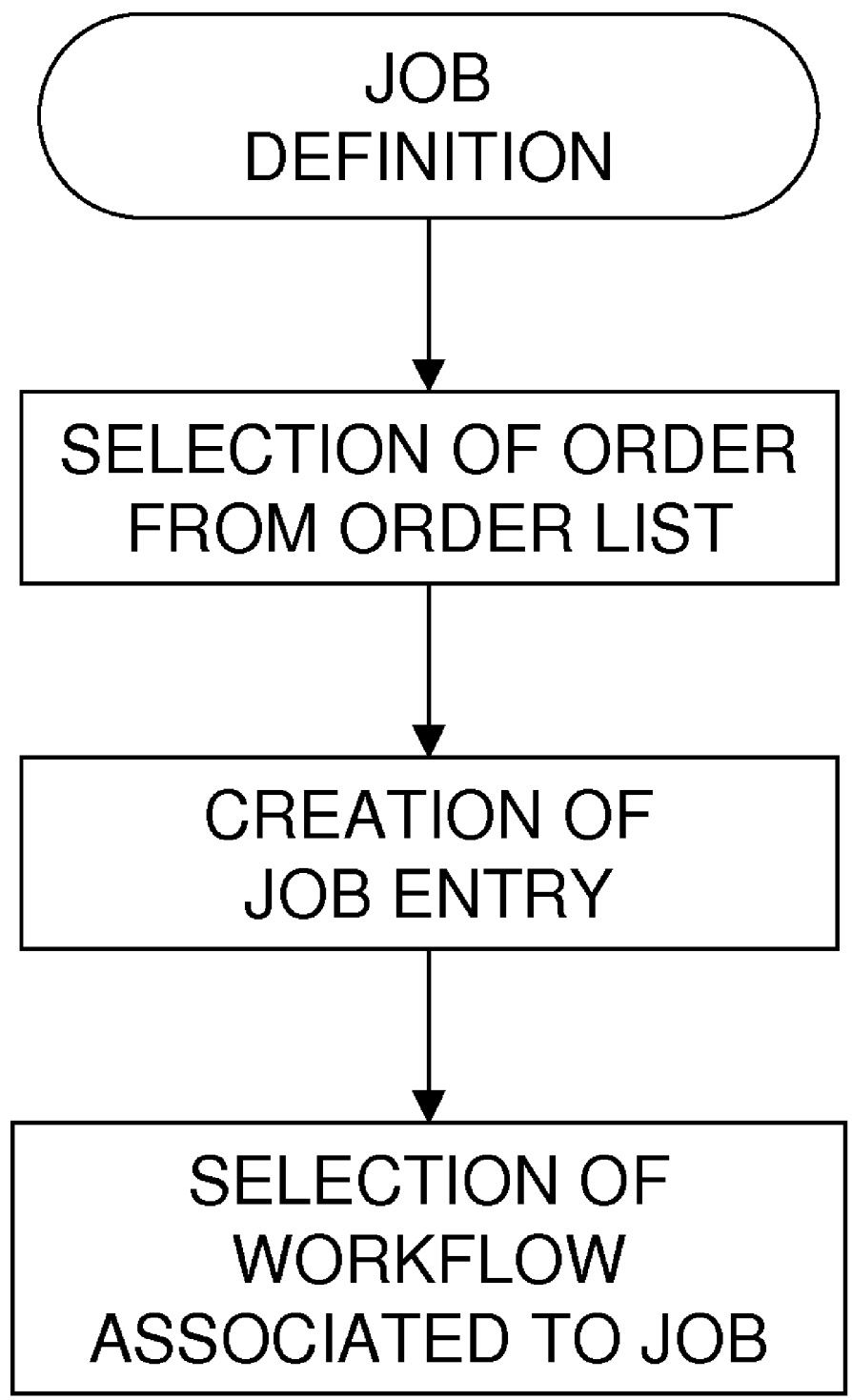
FIG. 10C is a flow chart illustrating a job definition process whereby distinct production jobs are created for a same order.

In the context of the example of FIGS. 10A and 10B, it is further assumed that the first series of banknotes is to be produced exclusively on stations "SuSi_1", "SOI_1", "SuNu_1" and "NP_1" and that the second series of banknotes is to be produced exclusively on stations "SuSi_2", "SOI_2", "SuNu_1" and "NP_1". More precisely, it is assumed that stations "SuSi_1" and "SOI_1" are configured exclusively to produce the first series, while stations "SuSi_2" and "SOI_2" are configured exclusively to produce the second series. As regards the numbering step, it will be assumed that the same station, i.e. station "SuNu_1" is used for both series, but that this station is configured specifically for one or the other order (i.e. the routing of both series involves passing the loads through the same machine, but at different points in time, i.e. according to different chronological routings). As regards the coating step, it will be assumed that the same station, i.e. station "NP_1" is used for producing both series, there being no difference in terms of required configuration (i.e. station "NP_1" is configured in the same way for each series). One will accordingly understand that the processing of the two series of the same order "20_Aureus_2007" requires different physical routings as well as different chronological routings through the processing stations.

In order to cope with this situation, specific workflows are defined for each series. More precisely, two workflows designated by identifiers "20_Aureus_Series_1" and "20_Aureus_Series_2" and deriving from the reference workflow "20_Aureus" (i.e. derived workflows) are defined as illustrated in FIGS. 10A and 10B.

In addition, as schematically illustrated in FIG. 10B, one further defines a corresponding production job (or simply "job") to deal with both series separately. A job definition process according to a preferred embodiment of the invention is illustrated by the flow chart of FIG. 10C and includes (i) the selection of an existing order within the list of previously-defined order, (ii) the creation of a new job entry, and (iii) the selection of a corresponding workflow associated to the job. These jobs are designated in FIG. 10B by identifiers "20_Aureus_2007_Job_1" and "20_Aureus_2007_Job_2". These jobs may be seen as a grouping of the loads in two distinct load groups. Each of this job is advantageously linked to a corresponding one of the above-mentioned derived workflows as illustrated in FIG. 10B, i.e. job "20_Aureus_2007_Job_1" is linked to workflow "20_Aureus_Series_1" while job "20_Aureus_2007_Job_2" is linked to workflow "20_Aureus_Series_2".

The above-described additional concepts of "derived workflows" and "jobs" facilitate the control of the production process, in particular the assignment of the stations required to carry out the corresponding workflow steps (penultimate step in FIG. 6A), and ensure that there will be no mix-up between the loads of the two series, such mix-up being prevented thanks to the load acceptance procedure explained above. Indeed, in this example, stations "SuSi_1" and "SOI_1" are exclusively assigned to carry out processing of the loads of the first series by assigning the stations not to the order as a whole but to the specific job "20_Aureus_2007_Job_1" and associated derived workflow "20_Aureus_Series_1". Similarly, stations "SuSi_2" and "SOI_2" are exclusively assigned to carry out processing of the loads of the second series by specifically assigning the stations to the specific job "20_Aureus_2007_Job_2" and associated derived workflow "20_Aureus_Series_2". In the same way, station "SuNu_1" will be assigned in the system to carry out either the specific job "20_Aureus_2007_Job_1" and associated derived workflow "20_Aureus_Series_1" or the specific job "20_Aureus_2007_Job_2" and associated derived workflow "20_Aureus_Series_2" depending on its actual configuration. On the other hand, station "NP_1" may be assigned to carry out any one of the defined jobs. At the time of its assignment, station "NP_1" may therefore be assigned to carry out processing of any load belonging to the order "20_Aureus_2007".

In other words, the concept of "workflows" (including reference and derived workflows) ensures a proper definition of the physical routing of the loads through the required stations, while the concept of "jobs" (which other concept is intimately related to the concept of "workflows") ensures a proper definition of the chronological routing of the loads through the same stations.

In the context of the above-described example, one will appreciate that the loads belonging to the order "20_Aureus_2007" will become part of one or the other of the jobs "20_Aureus_2007_Job_1" and "20_Aureus_2007_Job_2" depending on the station where they are first led, in this case station "SuSi_1" or "SuSi_2". In the above-described example, the loads follow a distinct processing and routing as soon as they are led to the first processing station in the workflow, i.e. station "SuSi_1" or "SuSi_2". Other situations are possible. Let us assume for instance that the two series of the same denomination only differ in their numberings, and that they both have the same offset and intaglio patterns. In such case, the loads could be produced on either one of stations "SuSi_1" and "SuSi_2" and "SOI_1" and "SOI_2" and these stations could accordingly be assigned to carry out processing of any load belonging to the order "20_Aureus_2007". In this case, a distinct routing would only be required at the time of the numbering step, i.e. when the loads are processed on station "SuNu_1". Assigning station "SuNu_1" to carry out one or the other of the jobs "20_Aureus_2007_Job_1", "20_Aureus_2007_Job_2" and associated derived workflows "20_Aureus_Series_1", "20_Aureus_Series_2", respectively, again ensures that there will not be any mix-up between the loads of each series.

If the loads were to be handled manually, without the system and method of the present invention, it would be highly difficult for an operator to know which load belongs to which job and where and when it would have to be processed. In such case, the risk of processing loads on the wrong machine and/or at the wrong time would be very high. This is particularly true in the context of the above-described examples where the loads need to follow distinct physical and chronological routings through the processing stations. Thanks to the invention, such risk is totally eliminated.

The concept of jobs has been described hereabove in the context of the production of loads according to distinct workflows. Jobs can however also be used to split up an order into smaller parts. This can be useful in particular when the volume of the order is high and involves a substantial production duration (e.g. several months of production), and one wishes to sub-divide the order into distinct sub-orders of smaller duration. In such case, all jobs might refer to the same general reference workflow. Within the scope of the present invention, it shall therefore be appreciated that a job may be generally considered as referring to any desired load grouping and may be linked to a reference workflow or any workflow deriving therefrom.

Various modifications and/or improvements may be made to the above-described embodiments without departing from the scope of the invention as defined by the annexed claims. For instance, the concept of "processing station" may encompass any sort of station where production loads might be processed. Such concept not only encompasses stations such as printing or processing presses as described above, but may also encompass stations where manual operations are carried out on the loads. Such manual operations may for instance consist in the storage of a load in a storage area or the manual counting of sheets, which operations do not necessarily involve the use of any particular processing equipment. Even in such situations, it might be convenient to define such operations as part of a particular production workflow.

In addition, it might be necessary to define a particular load processing sequence through specific production stages to ensure that the loads are processed according to a determined sequence through specific production steps. This is particularly true in case of the numbering and finishing operations that are typically carried out at the end of the banknote production process. Indeed, in such instances, it is often desired to produce banknotes according to a consecutively-numbered sequence. A particularly efficient way of achieving this aim is known as "non-collating numbering and finishing" and is disclosed in International application No. WO 2004/016433 A1 in the name of the present Applicant. This numbering and finishing methodology requires a determined processing sequence of the loads through the numbering and finishing stations More precisely, the load processing sequence through the numbering station shall be the same as the load processing sequence through the finishing station. A convenient way of achieving this might consist in combining the numbering and finishing stations in one station or by adequate control of the load processing sequence through these stations.

The invention claimed is:

1. A method for controlled production of security documents, especially banknotes, wherein said security documents are subjected to a plurality of successive printing and processing operations on a plurality of processing stations, said method comprising:
providing a computer network comprising a central server station coupled via a data network to a plurality of local computer stations, one local computer station being operatively coupled to each processing station,
defining at least one production order, which production order involves the production of a desired volume of security documents according to a defined production workflow, said production order being subdivided into a plurality of production loads each being assigned a machine-readable load identifier;

assigning selected processing stations among available processing stations to carry out processing of said production order according to said production workflow; and selectively processing each production load through the processing stations depending on the determined production workflow of the corresponding production order defined for each production load, whereby each production load is first subjected to a load acceptance procedure based on said machine-readable load identifier before being authorized to be processed on a selected processing station among said available processing stations.

2. The method according to claim 1, wherein said selective processing of each production load includes:
reading the machine-readable load identifier of the production load at the selected processing station where the production load is supposed to be processed;
checking whether the production state of the production load is such that the load can be processed on said selected processing station and/or whether the selected processing station has been assigned to process the production load; and
preventing or authorizing processing of the load on the said selected processing station depending on the result of the checking.

3. The method according to claim 1, wherein defining said at least one production order includes:
defining a desired volume of security documents to be produced;
defining a determined production workflow according to which the production order will be processed;
subdividing the production order into said plurality of production loads; and
generating the machine-readable load identifiers for each production load.

4. The method according to claim 3, wherein defining the determined production workflow includes defining a plurality of successive workflow steps and wherein at least one selected processing station among the available processing stations is assigned to carry out each workflow step.

5. The method according to claim 4, wherein a production load is eligible for processing on a selected one of the processing stations only if the selected processing station has previously been assigned to carry out the corresponding workflow step for that production load.

6. The method according to claim 1, further comprising the step of defining production jobs within a given production order, which production jobs involve distinct groupings of production loads which are to be processed according to a corresponding production workflow defined for the production order.

7. The method according to claim 6, further comprising the step of defining at least one derived production workflow from a reference production workflow, a distinct production job being defined and associated to each derived production workflow.

8. The method according to claim 1, wherein said production loads are at least temporarily stored in at least one storage vault or safe and wherein an additional local computer station, attributed to said storage vault or safe, is provided for recording when a production load is stored in said storage vault or safe and/or taken away from said storage vault or safe.

9. The method according to claim 8, wherein yet unprocessed production loads consisting of unprinted paper are stored in at least one white-paper storage vault or safe and wherein partly processed production loads are stored in at least one additional storage vault or safe.

10. The method according to claim 1, wherein said production loads are processed according to a handoff responsibility rule whereby responsibility associated to a given production load is transmitted together with the said given production load.

11. The method according to claim 1, wherein said security documents are printed onto sheets, each sheet holding a plurality of security documents and wherein each production load encompasses a plurality of said sheets.

12. The method according to claim 11, wherein each production load is defined at the start of the production process as a batch containing a predetermined number of sheets, which number of sheets is preferably selected to be comprised in the range of 7,500 to 10,000 sheets.

13. The method according to claim 11, wherein, as a result of each production step, each production load is subdivided into good sheets and waste sheets and wherein the production load is further processed with only the good sheets.

14. The method according to claim 13, wherein the number of good sheets and waste sheets is communicated to said central server station following processing of the production load.

15. The method according to claim 1, wherein a status of each production load is calculated on-the-fly based on load processing history of the production load 16. The method according to claim 1, wherein load processing data is stored locally at each processing station if said central server station is off-line and is transmitted to the central server station when said central server station is on-line.

17. The method according to claim 1, wherein said machine-readable load identifier is a barcode tag or an RFID tag.

18. A system for carrying out the method according to claim 1, said system including a plurality of processing stations and a computer network comprising a central server station coupled via a data network to a plurality of local computer stations, one local computer station being operatively coupled to each processing station, each local computer station being provided with means for reading said machine-readable load identifiers.

19. The system according to claim 18, wherein said computer network implements web-browsing technology to provide access to functionalities of the system at said local computer stations.

* * * * *